US011734196B1

(12) United States Patent
Grube et al.

(10) Patent No.: US 11,734,196 B1
(45) Date of Patent: *Aug. 22, 2023

(54) DECRYPTING SECURE PACKAGES IN A STORAGE NETWORK

(71) Applicant: Pure Storage, Inc., Mountain View, CA (US)

(72) Inventors: Gary W. Grube, Barrington Hills, IL (US); Timothy W. Markison, Mesa, AZ (US)

(73) Assignee: PURE STORAGE, INC., Santa Clara, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/197,807

(22) Filed: Mar. 10, 2021

Related U.S. Application Data

(63) Continuation of application No. 16/040,786, filed on Jul. 20, 2018, now Pat. No. 10,977,194, which is a
(Continued)

(51) Int. Cl.
*H04L 9/30* (2006.01)
*H04L 29/06* (2006.01)
(Continued)

(52) U.S. Cl.
CPC ...... *G06F 12/1408* (2013.01); *G06F 11/1004* (2013.01); *G06F 11/1076* (2013.01);
(Continued)

(58) Field of Classification Search
CPC .. G06F 12/1408; H04L 9/0894; H04L 63/061
See application file for complete search history.

(56) References Cited

U.S. PATENT DOCUMENTS 4,092,732 A    5/1978   Ouchi
5,454,101 A * 9/1995   Mackay .............. G06F 16/9017
                                                                   707/E17.037
(Continued)

OTHER PUBLICATIONS

Chung; An Automatic Data Segmentation Method for 3D Measured Data Points; National Taiwan University; pp. 1-8; 1998.
(Continued)

*Primary Examiner* — Wasika Nipa
(74) *Attorney, Agent, or Firm* — Garlick & Markison; Timothy D. Taylor

(57) ABSTRACT

A method for execution by a computing device of a storage network includes dispersed storage error decoding a plurality of sets of encoded data slices to recover a plurality of secure packages, where the plurality of secure packages include a plurality of encrypted data segments and a plurality of sets of encoded key slices, and where encoded key slices are appended to the encrypted data segments in accordance with an appending approach. The method includes splitting the plurality of secure packages into the plurality of encrypted data segments and the plurality of sets of encoded key slices. The method includes decoding the at least the decode threshold number of each set of the plurality of sets of encoded key slices to recover a plurality of encryption keys. The method includes decrypting the plurality of encrypted data segments using the plurality of encryption keys to recover the data segments.

20 Claims, 21 Drawing Sheets

Related U.S. Application Data continuation-in-part of application No. 15/799,943, filed on Oct. 31, 2017, now Pat. No. 10,055,283, which is a continuation-in-part of application No. 15/345,262, filed on Nov. 7, 2016, now Pat. No. 9,842,063, which is a continuation of application No. 14/499,570, filed on Sep. 29, 2014, now Pat. No. 9,495,240, which is a continuation of application No. 13/686,827, filed on Nov. 27, 2012, now Pat. No. 8,848,906.

(60) Provisional application No. 61/564,200, filed on Nov. 28, 2011.

(51) Int. Cl.

| | |
|---|---|
| *G06F 12/14* | (2006.01) |
| *H04L 9/40* | (2022.01) |
| *H04L 67/306* | (2022.01) |
| *H04L 67/1097* | (2022.01) |
| *H04L 9/32* | (2006.01) |
| *G06F 11/10* | (2006.01) |
| *H04L 9/14* | (2006.01) |
| *H04L 9/08* | (2006.01) |
| *H04L 67/06* | (2022.01) |
| *H04L 1/00* | (2006.01) |

(52) U.S. Cl.
CPC ............ *H04L 9/085* (2013.01); *H04L 9/0894* (2013.01); *H04L 9/14* (2013.01); *H04L 9/3239* (2013.01); *H04L 9/3263* (2013.01); *H04L 63/061* (2013.01); *H04L 67/06* (2013.01); *H04L 67/1097* (2013.01); *H04L 67/306* (2013.01); *G06F 2212/1052* (2013.01); *H04L 1/0041* (2013.01); *H04L 1/0045* (2013.01); *H04L 63/0428* (2013.01)

(56) References Cited

U.S. PATENT DOCUMENTS

| | | | |
|---|---|---|---|
| 5,485,474 A | 1/1996 | Rabin | |
| 5,764,767 A | 6/1998 | Beimel | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2* | 9/2006 | Redlich | G06F 21/6209 713/193 |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | De La Torre | |
| 8,458,233 B2 | 6/2013 | Gladwin | |
| 8,848,906 B2 | 9/2014 | Grube | |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 | 6/2004 | Menon | |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1* | 10/2007 | Soran | G06F 12/02 714/E11.13 |
| 2007/0283167 A1 | 12/2007 | Venters, III | |
| 2009/0094251 A1 | 4/2009 | Gladwin | |
| 2009/0094318 A1 | 4/2009 | Gladwin | |
| 2009/0323970 A1* | 12/2009 | Cerruti | G06F 21/602 380/281 |
| 2010/0023524 A1 | 1/2010 | Gladwin | |
| 2010/0169391 A1* | 7/2010 | Baptist | G06F 16/182 707/827 |
| 2010/0268938 A1* | 10/2010 | Resch | H04L 9/0897 713/153 |
| 2010/0268966 A1 | 10/2010 | Leggette et al. | |
| 2011/0126295 A1 | 5/2011 | Resch | |
| 2011/0286594 A1 | 11/2011 | Resch | |
| 2012/0243687 A1 | 9/2012 | Li et al. | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

(56) References Cited

OTHER PUBLICATIONS

Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

\* cited by examiner

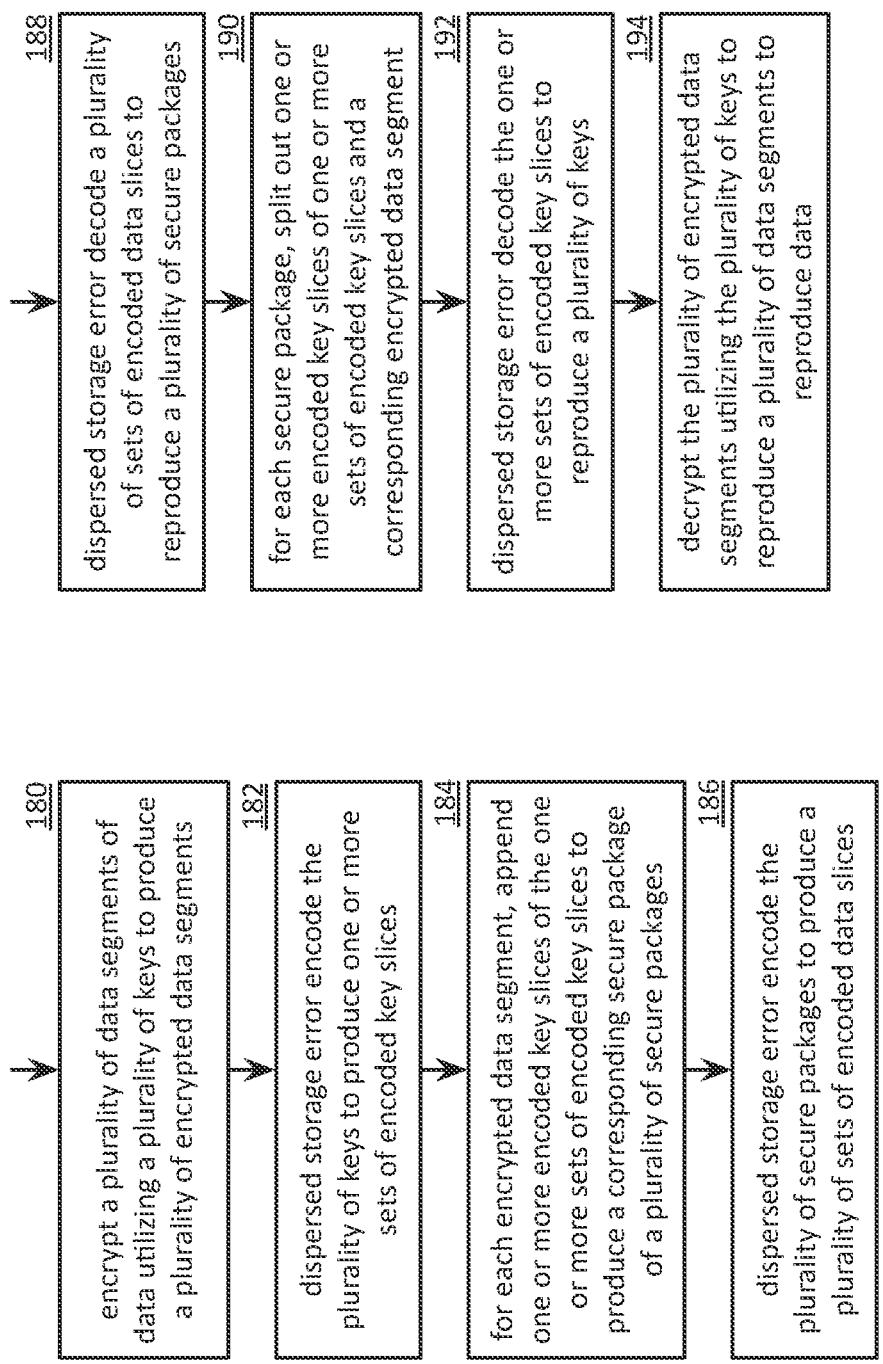

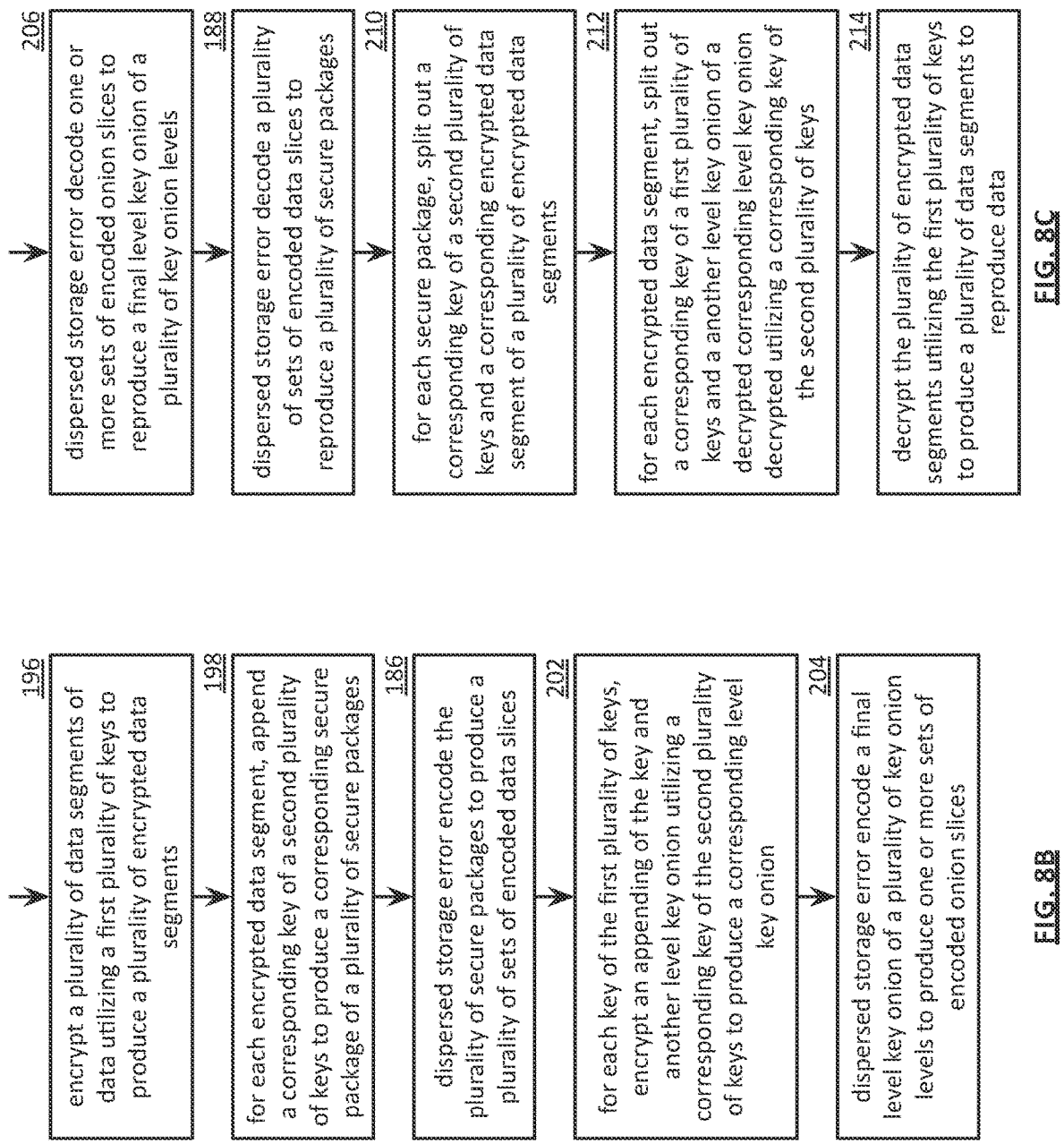

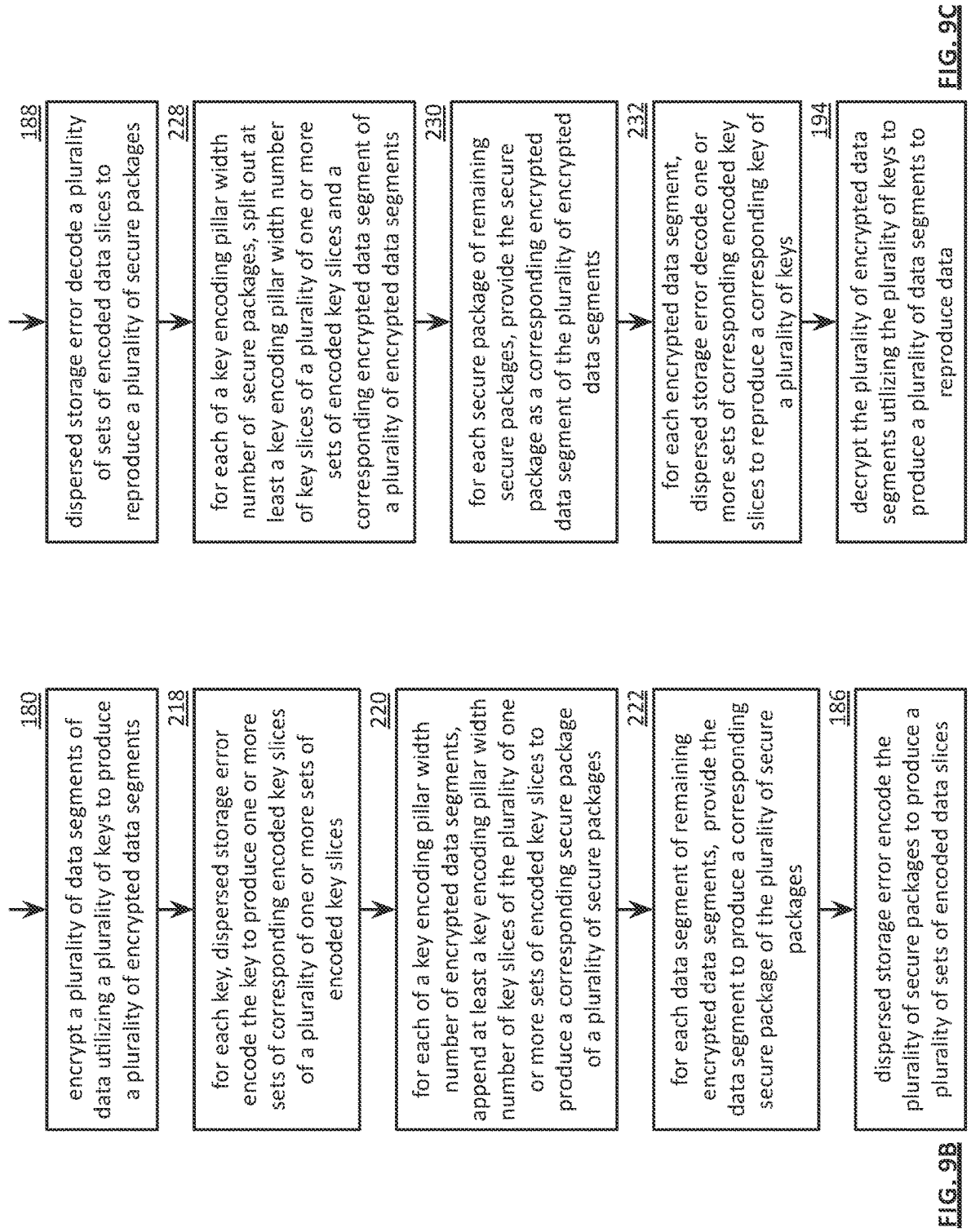

| secure packages 246 | |
|---|---|
| data segment 1 encrypted by key 1 | key slice 1 |
| data segment 2 encrypted by key 2 | |
| data segment 3 encrypted by key 3 | key slice 2 |
| data segment 4 encrypted by key 4 | |
| data segment 5 encrypted by key 5 | key slice 3 | key IDA
pillar width Wk= 5
decode threshold =3

FIG. 11A

| secure packages 248 | |
|---|---|
| data segment 1 encrypted by key 1 | key slice 1 |
| data segment 2 encrypted by key 2 | key slice 3 |
| data segment 3 encrypted by key 3 | key slice 4 |
| data segment 4 encrypted by key 4 | key slice 5 |
| data segment 5 encrypted by key 5 | key slice 2 | key IDA
pillar width Wk= 8
decode threshold =5

FIG. 11B

FIG. 14 secure packages 258

| data segment 1 encrypted by key 1 | key slices 1_1-2_1 | key slice 1_2 | | |
| --- | --- | --- | --- | --- |
| data segment 2 encrypted by key 2 | key slice 3_1 | key slice 2_3 | | |
| data segment 3 encrypted by key 3 | key slices 2_2-3_2 | | key slices 4_3-5_3 | |
| data segment 4 encrypted by key 4 | key slice 3_4 | key slices 1_5-2_5 | | |
| data segment 5 encrypted by key 5 | key slice 3_5 | key slice 2_4 | | key slice 5_4 | sets of encoded key slices 257

| key slices 1_1-5_1 |
| --- |
| key slices 1_2-5_2 |
| key slices 1_3-5_3 |
| key slices 1_4-5_4 |
| key slices 1_5-5_5 | key IDA
pillar width Wk= 5
decode threshold =3

DECRYPTING SECURE PACKAGES IN A STORAGE NETWORK

CROSS-REFERENCE TO RELATED PATENTS

This application claims priority pursuant to 35 U.S.C. § 120 as continuation of U.S. Utility application Ser. No. 16/040,786, entitled "SECURELY STORING RANDOM KEYS IN A DISPERSED STORAGE NETWORK," filed Jul. 20, 2018, which is a continuation-in-part of U.S. Utility application Ser. No. 15/799,943 entitled "SECURELY DISTRIBUTING RANDOM KEYS IN A DISPERSED STORAGE NETWORK," filed Oct. 31, 2017, issued as U.S. Pat. No. 10,055,283 on Aug. 21, 2018, which claims priority pursuant to 35 U.S.C. § 120 as a continuation-in-part of U.S. Utility application Ser. No. 15/345,262 entitled "ENCRYPTING DATA FOR STORAGE IN A DISPERSED STORAGE NETWORK," filed Nov. 7, 2016, issued as U.S. Pat. No. 9,842,063 on Dec. 12, 2017, which claims priority pursuant to 35 U.S.C. § 120 as a continuation of U.S. Utility application Ser. No. 14/499,570, entitled "ENCRYPTING DATA FOR STORAGE IN A DISPERSED STORAGE NETWORK," filed Sep. 29, 2014, issued as U.S. Pat. No. 9,495,240 on Nov. 15, 2016, which claims priority pursuant to 35 U.S.C. § 120 as a continuation of U.S. Utility application Ser. No. 13/686,827, entitled "ENCRYPTING DATA FOR STORAGE IN A DISPERSED STORAGE NETWORK," filed Nov. 27, 2012, issued as U.S. Pat. No. 8,848,906 on Sep. 30, 2014, which claims priority pursuant to 35 U.S.C. § 119(e) to U.S. Provisional Application No. 61/564,200, entitled "DISPERSED STORAGE NETWORK STORAGE MODULE," filed Nov. 28, 2011, expired, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n-1=capacity). RAID 6 can recover from a loss of two discs and requires a minimum of four discs with a storage capacity of n-2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 7B is a flowchart illustrating another example of encoding data in accordance with the invention;

FIG. 7C is a flowchart illustrating another example of decoding data in accordance with the invention;

FIG. 8B is a flowchart illustrating another example of encoding data in accordance with the invention;

FIG. 8C is a flowchart illustrating another example of decoding data in accordance with the invention;

FIG. 9B is a flowchart illustrating another example of encoding data in accordance with the invention; and FIG. 9C is a flowchart illustrating another example of decoding data in accordance with the invention;

FIGS. 11A-11B are schematic block diagrams of examples of secure packages in accordance with the invention;

FIG. 14 is a schematic block diagram of an example of secure packages in accordance with the invention.

DETAILED DESCRIPTION OF THE INVENTION

Figure 1:
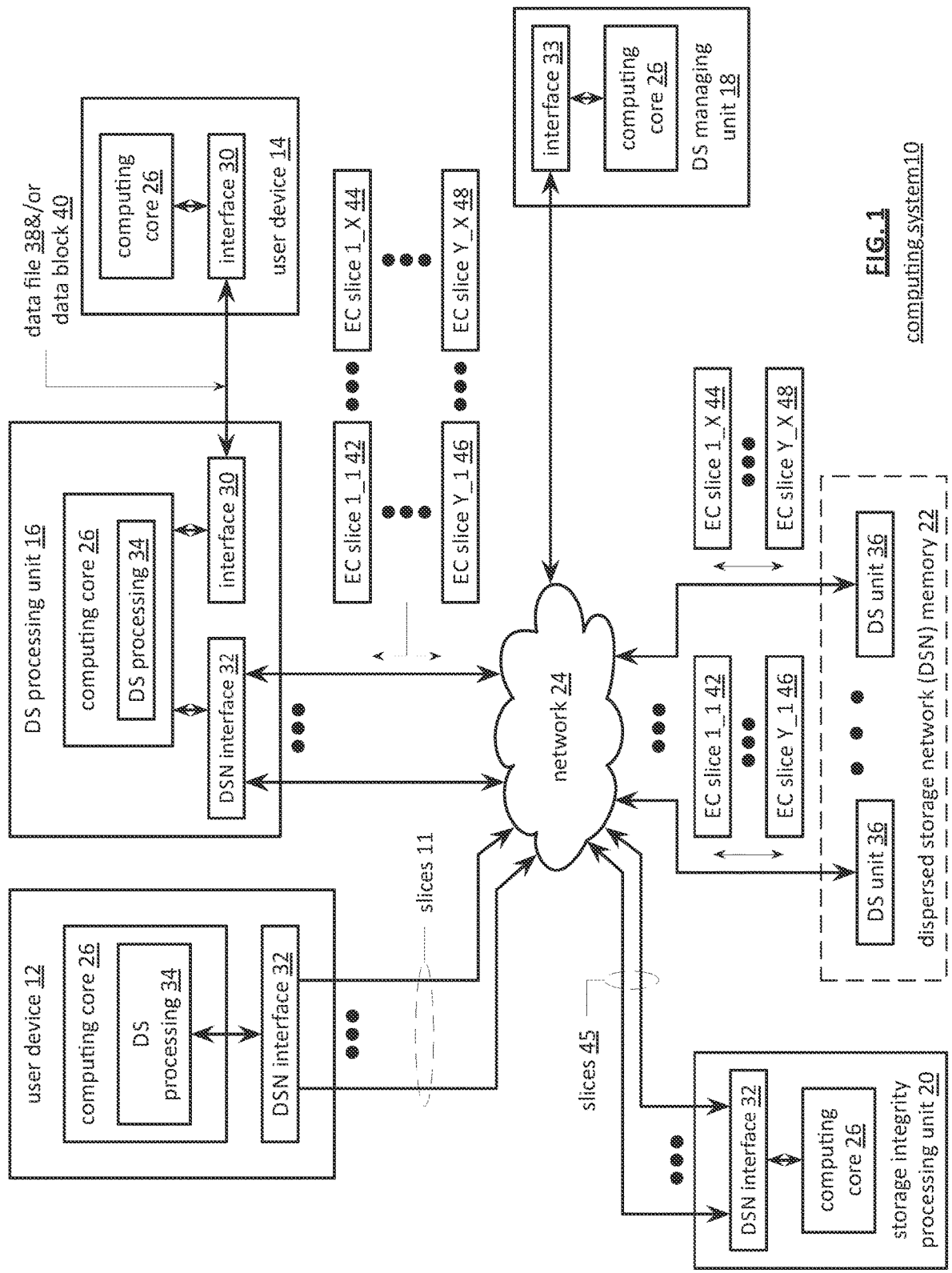
FIG. 1 is a schematic block diagram of an embodiment of a computing system in accordance with the invention.

FIG. 1 is a schematic block diagram of a computing system 10 (e.g., a dispersed or distributed storage network (DSN)) that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
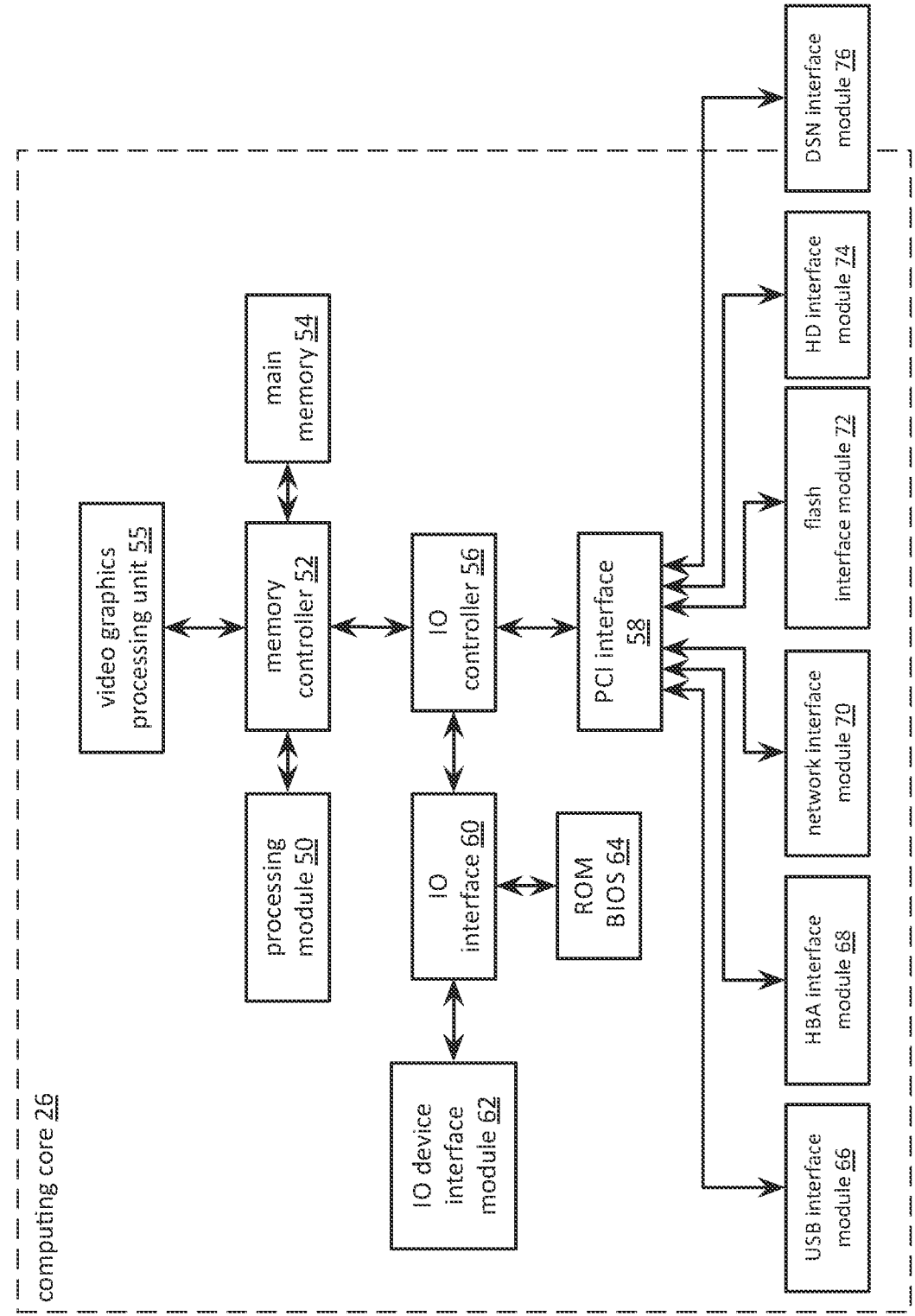
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
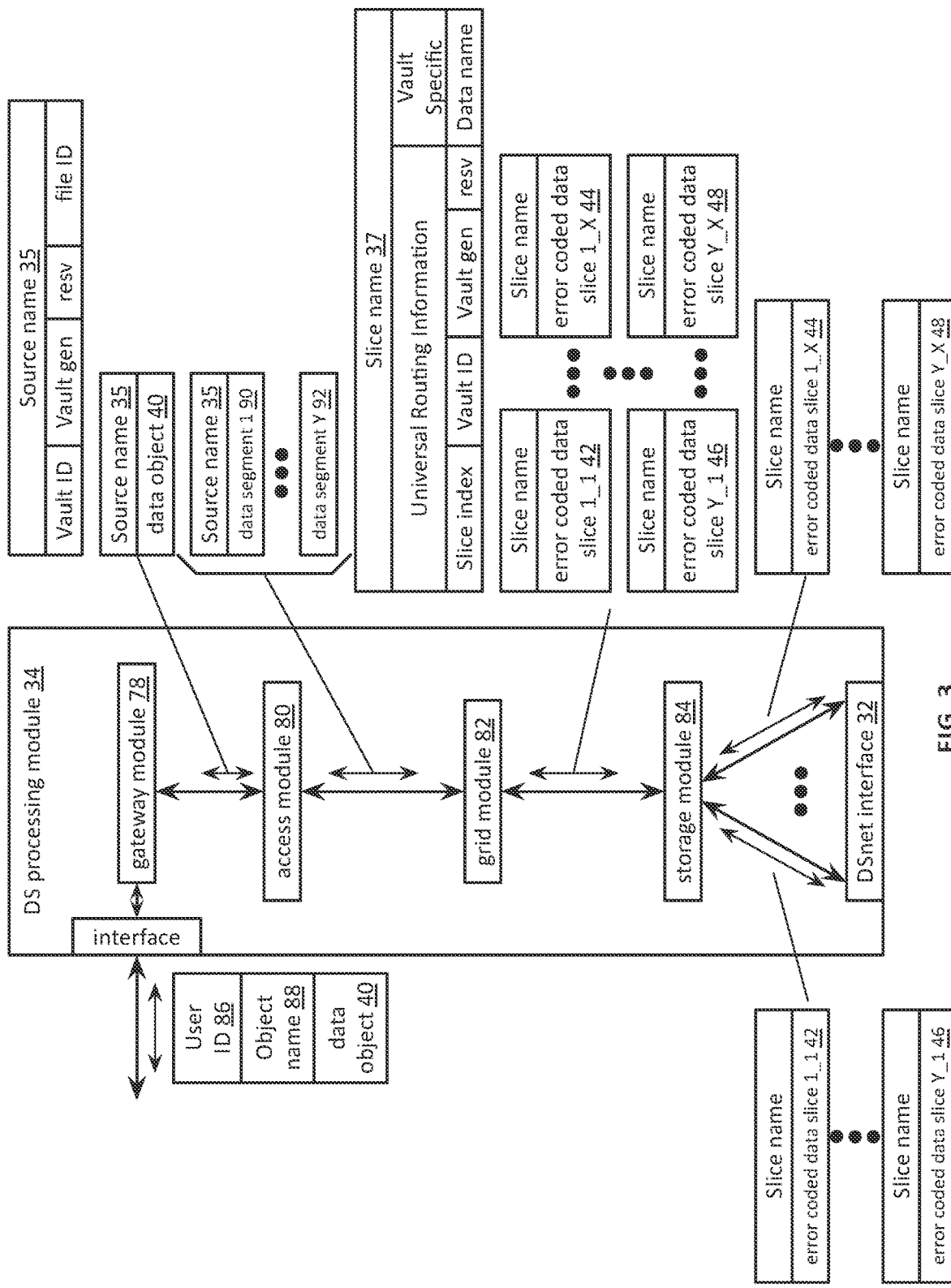
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
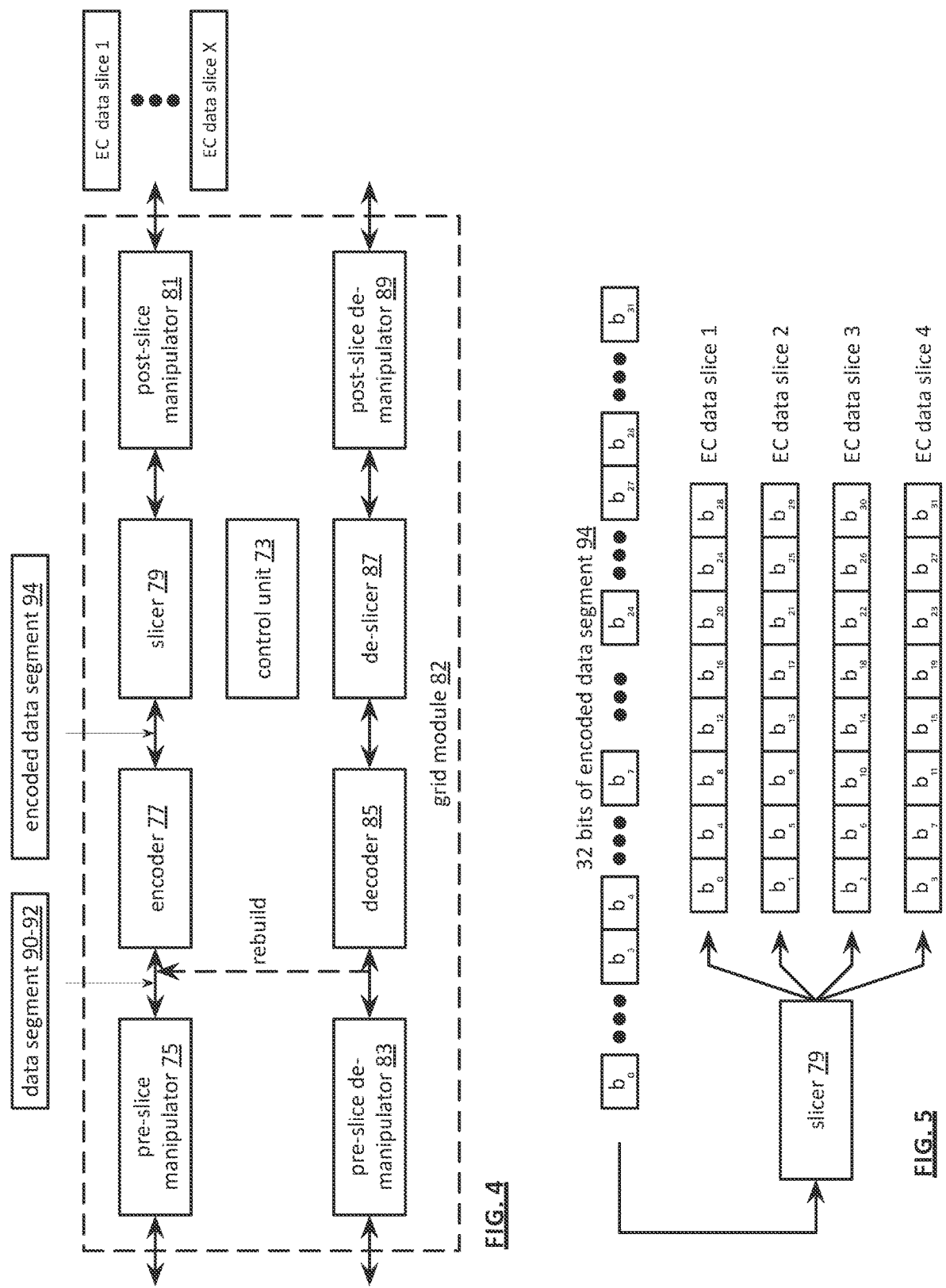
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, bytes, data words, etc., but may include more or less bits, bytes, data words, etc. The slicer 79 disperses the bits of the encoded data segment 94 across the EC data slices in a pattern as shown. As such, each EC data slice does not include consecutive bits, bytes, data words, etc. of the data segment 94 reducing the impact of consecutive bit, byte, data word, etc. failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
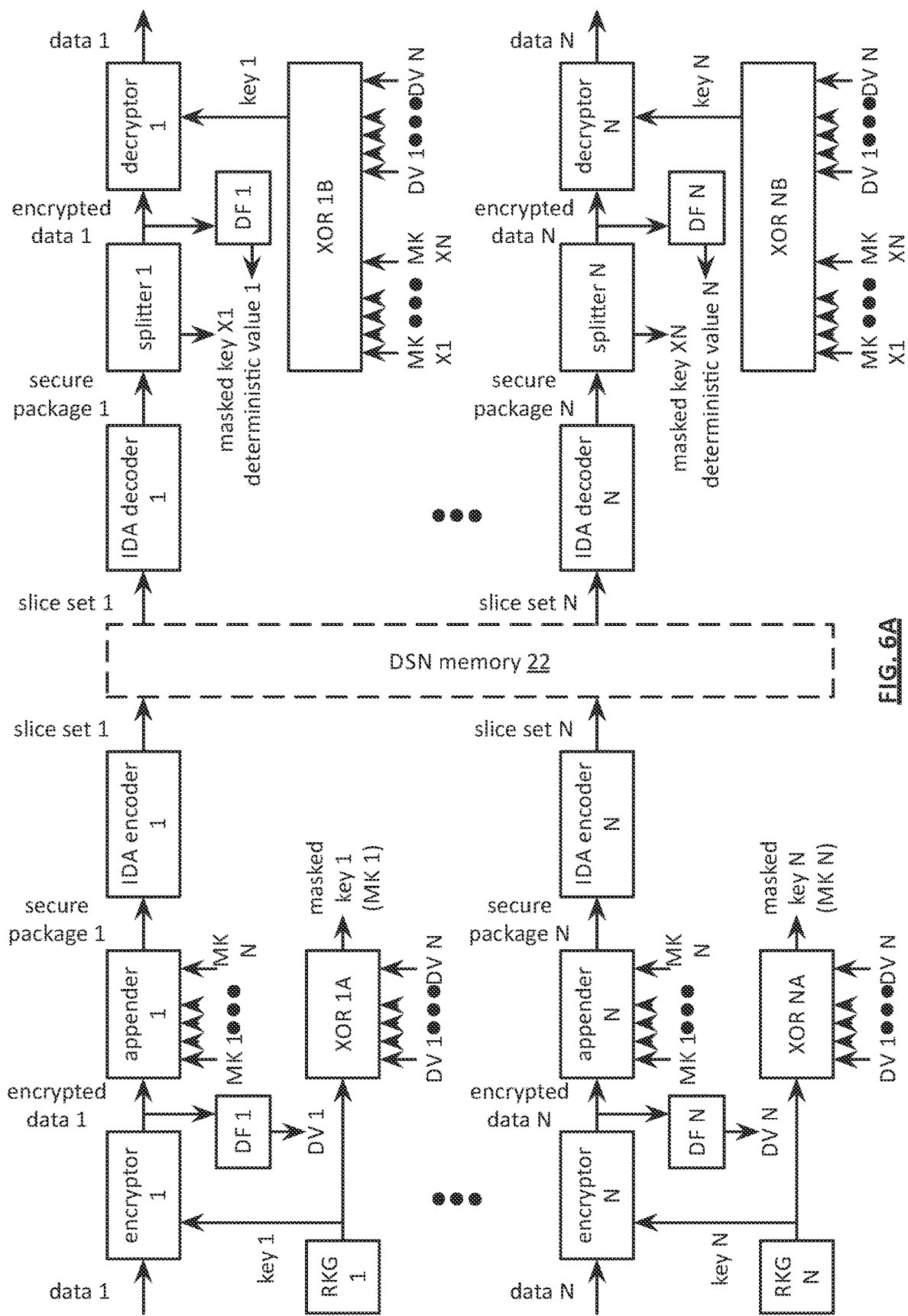
FIG. 6A is a schematic block diagram of an embodiment of a storage module in accordance with the invention.

FIG. 6A is a schematic block diagram of an embodiment of a storage module 84. The storage module 84 includes a plurality of encryptors 1-N, a plurality of appenders 1-N, a plurality of information dispersal algorithm (IDA) encoders 1-N, a plurality of deterministic functions (DF) 1-N, a plurality of random key generators (RKG) 1-N, a plurality of exclusive OR functions (XOR) 1A-NA, a plurality of exclusive OR functions (XOR) 1B-NB, a plurality of IDA decoders 1-N, a plurality of splitters 1-N, and a plurality of decryptors 1-N, all of which may be implemented as one or more modules. Data for storage in a dispersed storage network (DSN) memory 22 is presented as a plurality of data 1-N (e.g., data segments 1-N of data) to the storage module 84. The storage module 84 dispersed storage error encodes each data segment of the plurality of data segments 1-N to produce a plurality of sets 1-N of encoded data slices for storage in the DSN memory 22. The storage module 84 receives the plurality of sets 1-N of encoded data slices from the DSN memory 22 and dispersed storage error decodes each set of the plurality of sets 1-N of encoded data slices to reproduce the plurality of sets of data segments 1-N to reproduce the data.

RKGs 1-N generate a plurality of keys 1-N based on a key generating approach. The key generating approach may be based on one or more of a key seed, a pseudorandom sequence, a random number generator, a predetermined list, a lookup, a private key retrieval, and public-key retrieval, a public/private key pair generation, and a key generation algorithm. The encryptors 1-N encrypt data segments 1-N to produce a plurality of encrypted data 1-N utilizing keys 1-N. The deterministic functions 1-N perform a deterministic function on encrypted data 1-N to produce a plurality of deterministic values 1-N in accordance with a deterministic function algorithm. The deterministic function algorithm includes at least one of a mathematical function (e.g., addition, subtraction, division, multiplication, etc.), a hashing function, a checksum function (e.g., a cyclic redundancy check), a hash-based message authentication code (HMAC), a mask generating function (MGF), and a compression function (e.g., repeated applications of a bitwise exclusive OR). For example, deterministic function 1 performs a hashing function on encrypted data 1 to produce deterministic value 1.

The plurality of XOR functions 1A-NA mask the plurality of keys 1-N to produce a plurality of masked keys (MK) 1-N in accordance with a masking function. The masking function includes selecting at least one deterministic value of the plurality of deterministic values 1-N to produce a selected deterministic value and performing a logical XOR function on a corresponding key of the plurality of keys 1-N with the selected deterministic value to produce a corresponding masked key of the plurality of masked keys 1-N. The selecting may be based on or more of a user identity (ID), a vault ID, a lookup, a predetermination, a security requirement, a data type indicator, a data size indicator, a data ID, a filename, and dispersal parameters. For example, XOR 1A selects DV 2 based on a dispersal parameter that indicates to utilize a deterministic value of an adjacent data segment.

The plurality of appenders 1-N append the plurality of masked keys 1-N to the plurality of encrypted data 1-N to produce a plurality of secure packages 1-N based on an appending approach. Each masked key of the plurality of masked keys 1-N is appended to at least one encrypted data of the plurality of encrypted data 1-N. At least one of the secure packages of the plurality of secure packages 1-N includes one or more masked keys of the plurality of mass keys 1-N. The appending approach includes selecting a masked key of the plurality of masked keys 1-N in accordance with a selecting approach to produce one or more selected masked keys when a masked key is selected and one of appending the one or more selected masked keys to a corresponding encrypted data to produce a corresponding secure package when the masked key is selected or providing the corresponding encrypted data as the corresponding secure package when the masked key is not selected. The selecting approach may be based on or more of the user identity (ID), the vault ID, a lookup, a predetermination, a security requirement, the data type indicator, the data size indicator, the data ID, the filename, and the dispersal parameters. For example, appender 1 selects MK 2 based on a dispersal parameter that indicates to utilize a masked key of an adjacent data segment. As another example, appender 2 selects MK 3 and MK 4 based on a masked key selection table lookup.

The plurality of IDA encoders 1-N dispersed storage error encode the plurality of secure packages 1-N in accordance with the dispersal parameters to produce the plurality of sets 1-N of encoded data slices. For example, IDA encoder N dispersed storage error encodes secure package N to produce slice set N of encoded data slices in accordance with the dispersal parameters. The plurality of sets 1-N of encoded data slices IS sent to the DSN memory 22 for storage therein.

The plurality of IDA decoders 1-N receive the plurality of sets 1-N of encoded data slices from the DSN memory 22 and dispersed storage error decode the plurality of sets 1-N of encoded data slices in accordance with the dispersal parameters to reproduce the plurality of sets of secure packages 1-N. For example, IDA decoder 3 receives slice set 3 of encoded data slices and dispersed storage error decodes slice set 3 in accordance with the dispersal parameters to reproduce secure package 3.

The splitters 1-N splits the secure packages 1-N into the plurality of encrypted data 1-N and the plurality of masked keys X1-XN in accordance with a splitting approach. The splitting approach may be based on or more of the user identity (ID), the vault ID, a lookup, a predetermination, a security requirement, the data type indicator, the data size indicator, the data ID, the filename, and the dispersal parameters. For example, splitter 1 splits secure package 1 into encrypted data 1 and MK 2 as X1 based on a dispersal parameter that indicates that MK 2 was appended to encrypted data 1. As another example, splitter 2 splits secure package 2 into encrypted data 2 and MK 3, MK 4 as X2 based on a masked key selection table lookup. The deterministic functions 1-N perform a deterministic function on the plurality of encrypted data 1-N to reproduce the plurality of deterministic values 1-N in accordance with the deterministic function algorithm.

The plurality of XOR functions 1B-NB unmasks the plurality of masked keys 1-N of masked keys X1-XN to reproduce the plurality of keys 1-N in accordance with an unmasking function. The unmasking function includes selecting at least one deterministic value of the plurality of deterministic values 1-N in accordance with a decode selecting approach to produce a selected deterministic value and performing a logical XOR function on a corresponding masked key of the plurality of masked keys 1-N with the selected deterministic value to reproduce a corresponding key of the plurality of keys 1-N as a reproduced key. The decode selecting approach may be based on one or more of the user identity (ID), the vault ID, a lookup, a predetermination, a security requirement, the data type indicator, the data size indicator, the data ID, the filename, and dispersal parameters. For example, XOR 1B selects DV 2 as the selected deterministic value based on a dispersal parameter that indicates to utilize a deterministic value of an adjacent data segment and performs the logical XOR function on MK1 and DV2 to reproduce key 1. The plurality of decryptors 1-N decrypt the plurality of encrypted data 1-N utilizing the plurality of reproduced keys 1-N to reproduce data 1-N to reform the data. For example, decryptor 4 decrypts encrypted data segment 4 utilizing reproduced key 4 to reproduce data 4.

Figure 6B:
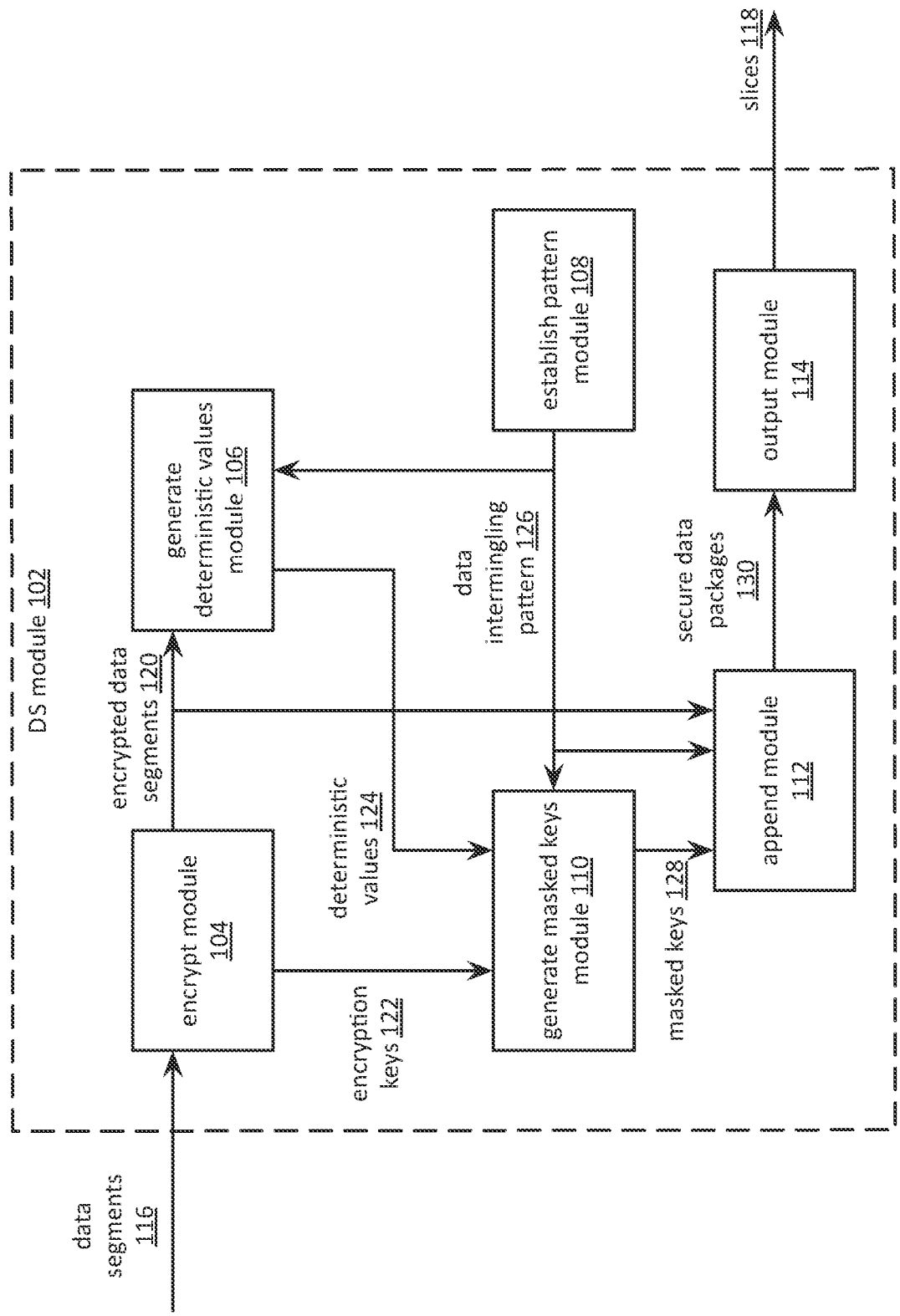
FIG. 6B is a schematic block diagram of another embodiment of a storage module in accordance with the invention.

FIG. 6B is a schematic block diagram of another embodiment of a storage module that includes a distributed/dispersed storage (DS) module 102. The DS module 102 may be implemented utilizing at least one of a user device, a DS processing unit, and a DS unit. The DS module 102 includes an encrypt module 104, a generate deterministic values module 106, an establish pattern module 108, a generate masked keys module 110, and append module 112, and an output module 114. The DS module 102 is operable to process a plurality of data segments 116 to produce a plurality of sets of encoded data slices 118.

The encrypt module 104 encrypts the plurality of data segments 116 of data using a plurality of encryption keys 122 to produce a plurality of encrypted data segments 120. The encrypt module 104 further functions to generate the plurality of encryption keys 122 using a plurality of random key generation functions. For example, for each data segment of the plurality of data segments 116, the encrypt module 104 generates a random number, generates an encryption key based on the random number, and encrypts the data segment to produce a corresponding encrypted data segment.

The generate deterministic values module 106 generates a plurality of deterministic values 124 from the plurality of encrypted data segments 120 using one or more deterministic functions. The one or more deterministic functions includes one or more of a hash function, a mask generating function (MGF), and a hash-based message authentication code (HMAC) function. For example, for each encrypted data segment, the generate deterministic values module 106 performs the hash function on the encrypted data segment to produce a corresponding deterministic value. The generate deterministic values module 106 may select the one or more deterministic functions in accordance with a data intermingling pattern 126. For example, the generate deterministic values module 106 selects the HMAC function for a first encrypted data segment and selects the MGF function for a second encrypted data segment when the data intermingling pattern 126 specifies the HMAC function for the first encrypted data segment and the MGF function for the second encrypted data segment.

The establish pattern module 108 establishes the data intermingling pattern 126 for the plurality of encrypted data segments 120. The establish pattern module 108 establishes the data intermingling pattern 126 to include a first selection pattern to select one or more of the plurality of deterministic values 124, a second selection pattern for associating each of the plurality of encryption keys 122 with at least one corresponding one of the selected one or more of the plurality of deterministic values 124, and a third selection pattern for associating each of the plurality of encrypted data segments 120 with at least one corresponding one of a plurality of masked keys 128. The establish pattern module 108 establishes the data intermingling pattern 126 such that each of the first, second, and third selection pattern is based on one or more of a pseudorandom sequence based on a seed number (e.g., a receiving entity has same seed), a predetermination, hard coding (e.g., a fixed pattern), a previous first, second, or third selection pattern, and a segment number mapping.

The generate masked keys module 110 generates the plurality of masked keys 128 by selecting one or more of the plurality of deterministic values 124 in accordance with the data intermingling pattern 126 and performing a masking function on the plurality of encryption keys 122 and the selected one or more of the plurality of deterministic values 124. The masking function includes at least one of an arithmetic function and a logical function. The logical function includes at least one of an exclusive OR function, an AND function, and an OR function. For example, the generate masked keys module 110 generates a first masked key by performing the exclusive OR function on a first encryption key and a 10th deterministic value when the data intermingling pattern 126 indicates to select the 10th deterministic value for the first encryption key.

The append module 112 appends the plurality of masked keys 128 to the plurality of encrypted data segments 120 in accordance with the data intermingling pattern 126 to produce a plurality of secure data packages 130. The appending includes at least one of appending a masked key to an end of an encrypted data segment, interleaving the masked key with the encrypted data segment, and inserting the masked key within the encrypted data segment. For example, the append module 112 appends a 20th masked key to a trailing end of a first encrypted data segment to produce a first secure data package when the data intermingling pattern 126 indicates to utilize the 20th masked key with the first encrypted data segment.

The output module 114 outputs the plurality of secure data packages 130 for storage. The output module 114 outputs the plurality of secure data packages by performing a dispersed storage error encoding function on the plurality of secure data packages 130 to produce the plurality of sets of encoded data slices 118 and outputs the plurality of sets of encoded data slices 118. The outputting includes at least one of storing the plurality of sets of encoded data slices 118 in a dispersed storage network memory and transmitting the plurality of sets of encoded data slices 118 to a receiving entity.

Figure 6C:
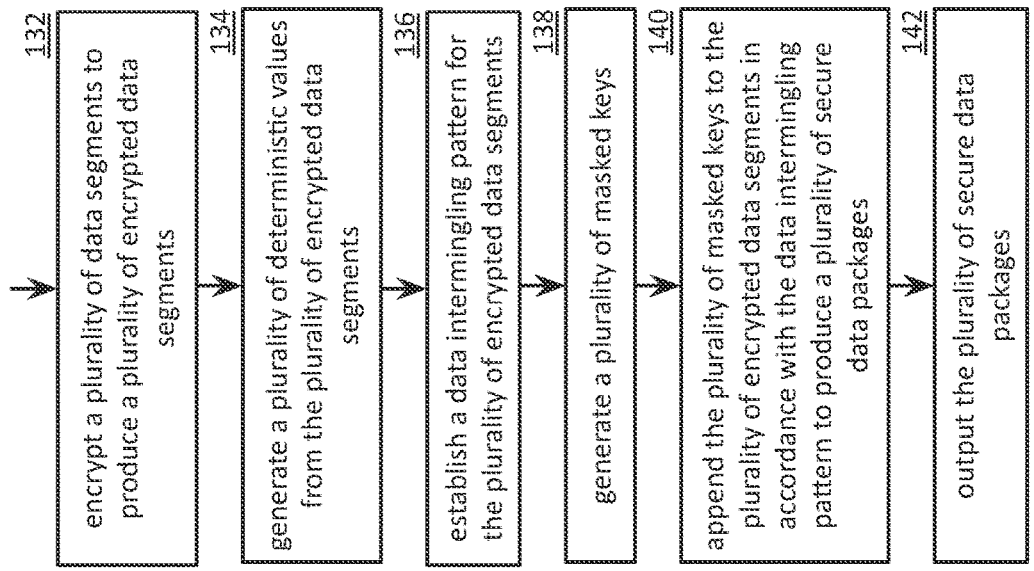
FIG. 6C is a flowchart illustrating an example of storing data in accordance with the invention.

FIG. 6C is a flowchart illustrating an example of storing data. The method begins at step 132 where a processing module (e.g., of a dispersed storage (DS) module) encrypts a plurality of data segments of data using a plurality of encryption keys to produce a plurality of encrypted data segments. The processing module may generate the plurality of encryption keys using a plurality of random key generation functions. The method continues at step 134 where the processing module generates a plurality of deterministic values from the plurality of encrypted data segments using one or more deterministic functions.

The method continues at step 136 where the processing module establishes a data intermingling pattern for the plurality of encrypted data segments. The data intermingling pattern includes a first selection pattern to select one or more of the plurality of deterministic values, a second selection pattern for associating each of the plurality of encryption keys with at least one corresponding one of the selected one or more of the plurality of deterministic values, and a third selection pattern for associating each of the plurality of encrypted data segments with at least one corresponding one of a plurality of masked keys. The establishing the data intermingling pattern for each of the first, second, and third selection pattern is based on one or more of a pseudorandom sequence based on a seed number (e.g., a receiving entity has same seed), a predetermination, hard coding (e.g., a fixed pattern), a previous first, second, or third selection pattern, and a segment number mapping.

The method continues at step 138 where the processing module generates the plurality of masked keys by selecting one or more of the plurality of deterministic values in accordance with the data intermingling pattern and performing a masking function on the plurality of encryption keys and the selected one or more of the plurality of deterministic values. The method continues at step 140 where the processing module appends the plurality of masked keys to the plurality of encrypted data segments in accordance with the data intermingling pattern to produce a plurality of secure data packages. The method continues at step 142 where the processing module outputs the plurality of secure data packages for storage. The outputting the plurality of secure data packages includes performing a dispersed storage error encoding function on the plurality of secure data packages to produce a plurality of sets of encoded data slices and outputting the plurality of sets of encoded data slices.

Figure 6D:
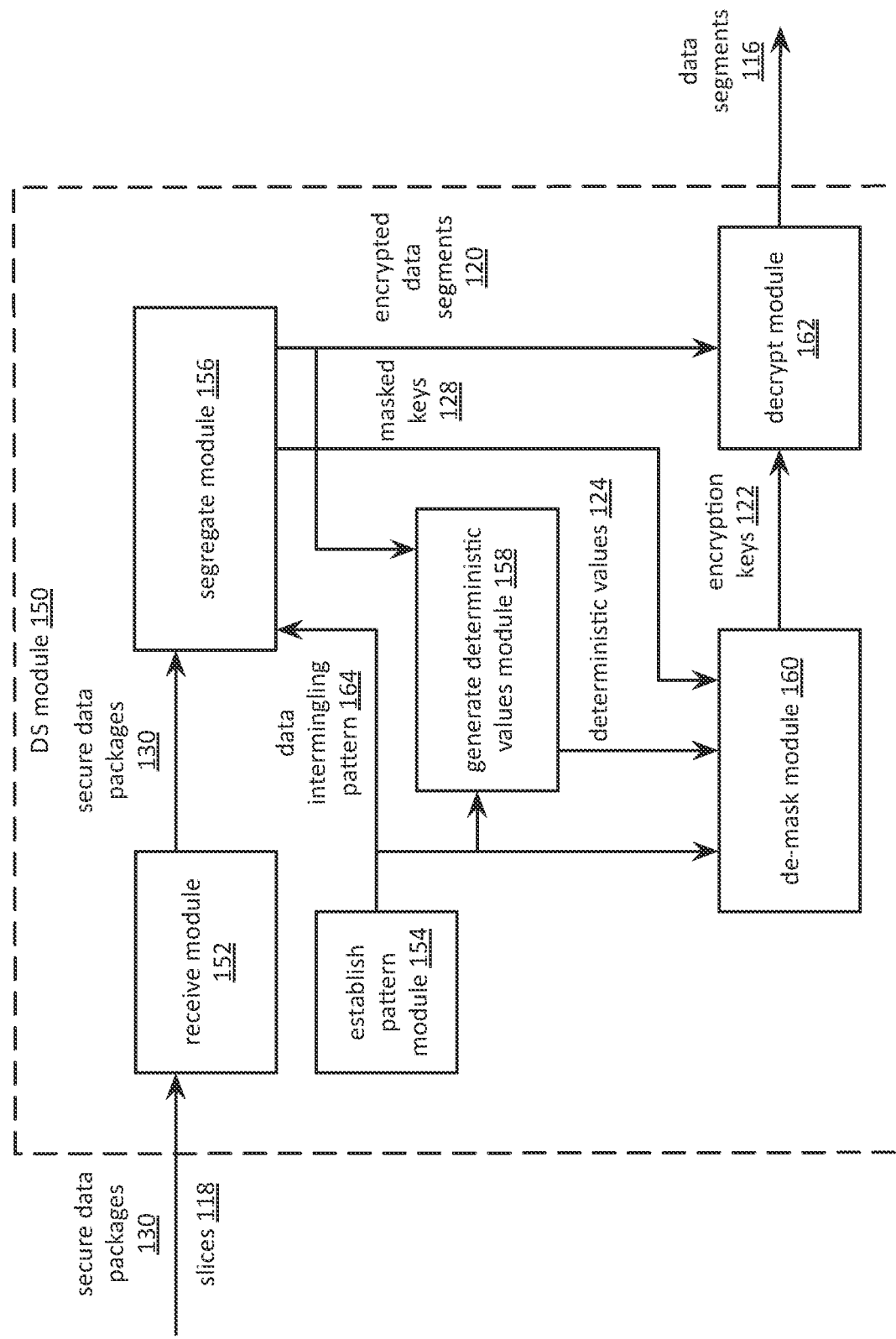
FIG. 6D is a schematic block diagram of another embodiment of a storage module in accordance with the invention.

FIG. 6D is a schematic block diagram of another embodiment of a storage module that includes a distributed/dispersed storage (DS) module 150. The DS module 150 may be implemented utilizing at least one of a user device, a DS processing unit, and a DS unit. The DS module 150 includes a receive module 152, an establish pattern module 154, a segregate module 156, a generate deterministic values module 158, a de-mask module 160, and a decrypt module 162. The DS module 150 is operable to process a plurality of secure data packages 130 to produce a plurality of data segments 116 of stored data.

The receive module 152 retrieves the plurality of secure data packages 130. The receive module 152 retrieves the plurality of secure data packages 130 by at least one of retrieving a plurality of sets of encoded data slices 118 and receiving the plurality of secure data packages 130 (e.g., directly). The receive module 152 retrieves the plurality of secure data packages 130 by retrieving the plurality of sets of encoded data slices 118 (e.g., retrieve a dispersed storage network memory, receive from a sending entity) and performing a dispersed storage error decoding function on the plurality of sets of encoded data slices to produce the plurality of secure data packages 130 when receiving the plurality of secure data packages 130 as the plurality of sets of encoded data slices 118.

The establish pattern module 154 establishes a data intermingling pattern 164 for the plurality of secure data packages 130. The data intermingling pattern 164 includes a first selection pattern to select a one or more of a plurality of deterministic values 124, a second selection pattern for associating each of a plurality of encryption keys 122 with at least one corresponding one of the plurality of deterministic values 124, and a third selection pattern for associating each of a plurality of encrypted data segments 120 with at least one corresponding one of the plurality of encryption keys 122. The establish pattern module 154 establishes the data intermingling pattern 126 such that each of the first, second, and third selection pattern is based on one or more of a pseudorandom sequence based on a seed number, a predetermination, hard coding, a previous first, second, or third selection pattern, and a segment number mapping.

The segregate module 156 segregates the plurality of secure data packages 130 in accordance with the data intermingling pattern 126 to produce a plurality of masked keys 128 and the plurality of encrypted data segments 120. The generate deterministic values module 158 generates the plurality of deterministic values 124 from the plurality of encrypted data segments 120 using one or more deterministic functions. The one or more deterministic functions includes one or more of a hash function, a mask generating function, and a hash-based message authentication code (HMAC) function. The generate deterministic values module 158 may select the one or more deterministic functions in accordance with the data intermingling pattern 126.

The de-mask module 160 performs a masking function on the plurality of masked keys 128 and the plurality of deterministic values 124 in accordance with the data intermingling pattern 126 to produce the plurality of encryption keys 122. For example, the de-mask module 160 performs an exclusive OR function on a 20th masked key and a 10th deterministic value to produce a first encryption key when the data intermingling pattern 126 indicates to select the 10th deterministic value and the 20th masked key for the first encryption key. The decrypt module 162 decrypts the plurality of encrypted data segments 120 using the plurality of encryption keys 122 to produce the plurality of data segments 116 of the stored data. For example, the decrypt module 162 decrypts a first encrypted data segment using the first encryption key to produce a first data segment.

Figure 6E:
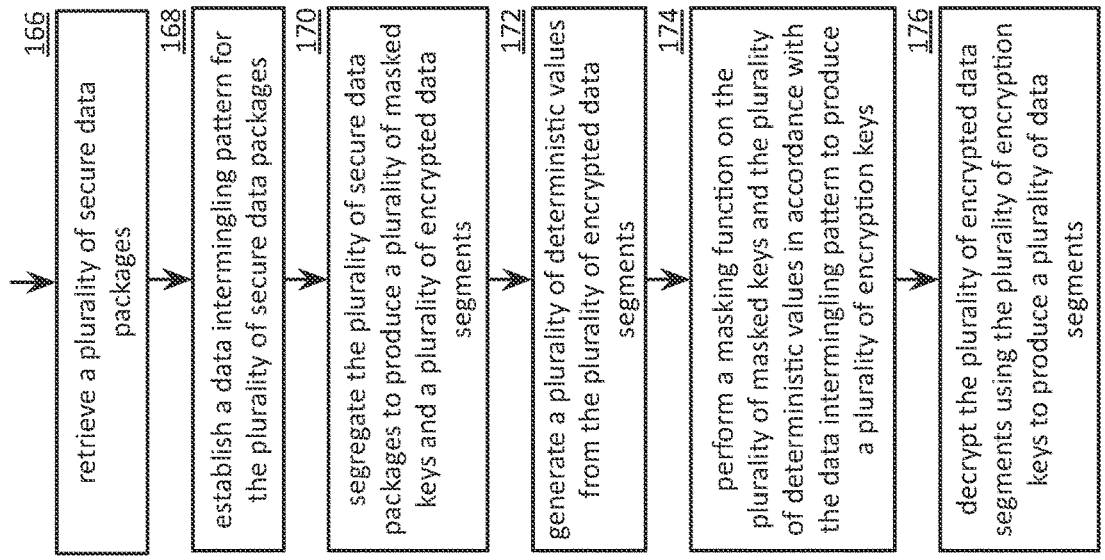
FIG. 6E is a flowchart illustrating an example of retrieving stored data in accordance with the invention.

FIG. 6E is a flowchart illustrating an example of retrieving stored data. The method begins at step 166 where a processing module (e.g., of a dispersed storage (DS) module) retrieves a plurality of secure data packages. The retrieving the plurality of secure data packages includes retrieving a plurality of sets of encoded data slices (e.g., retrieve a DSN memory, receive from a sending entity) and performing a dispersed storage error decoding function on the plurality of sets of encoded data slices to produce the plurality of secure data packages.

The method continues at step 168 where the processing module establishes a data intermingling pattern for the plurality of secure data packages. The data intermingling pattern includes a first selection pattern to select a one or more of a plurality of deterministic values, a second selection pattern for associating each of a plurality of encryption keys with at least one corresponding one of the plurality of deterministic values, and a third selection pattern for associating each of a plurality of encrypted data segments with at least one corresponding one of the plurality of encryption keys. The establishing the data intermingling pattern includes establishing each of the first, second, and third selection pattern is based on one or more of a pseudorandom sequence based on a seed number, a predetermination, hard coding, a previous first, second, or third selection pattern, and a segment number mapping.

The method continues at step 170 where the processing module segregates the plurality of secure data packages in accordance with the data intermingling pattern to produce a plurality of masked keys and a plurality of encrypted data segments. The method continues at step 172 where the processing module generates a plurality of deterministic values from the plurality of encrypted data segments using one or more deterministic functions. The method continues at step 174 where the processing module performs a masking function on the plurality of masked keys and the plurality of deterministic values in accordance with the data intermingling pattern to produce a plurality of encryption keys. The method continues at step 176 where the processing module decrypts the plurality of encrypted data segments using the plurality of encryption keys to produce a plurality of data segments of the stored data.

Figure 7A:
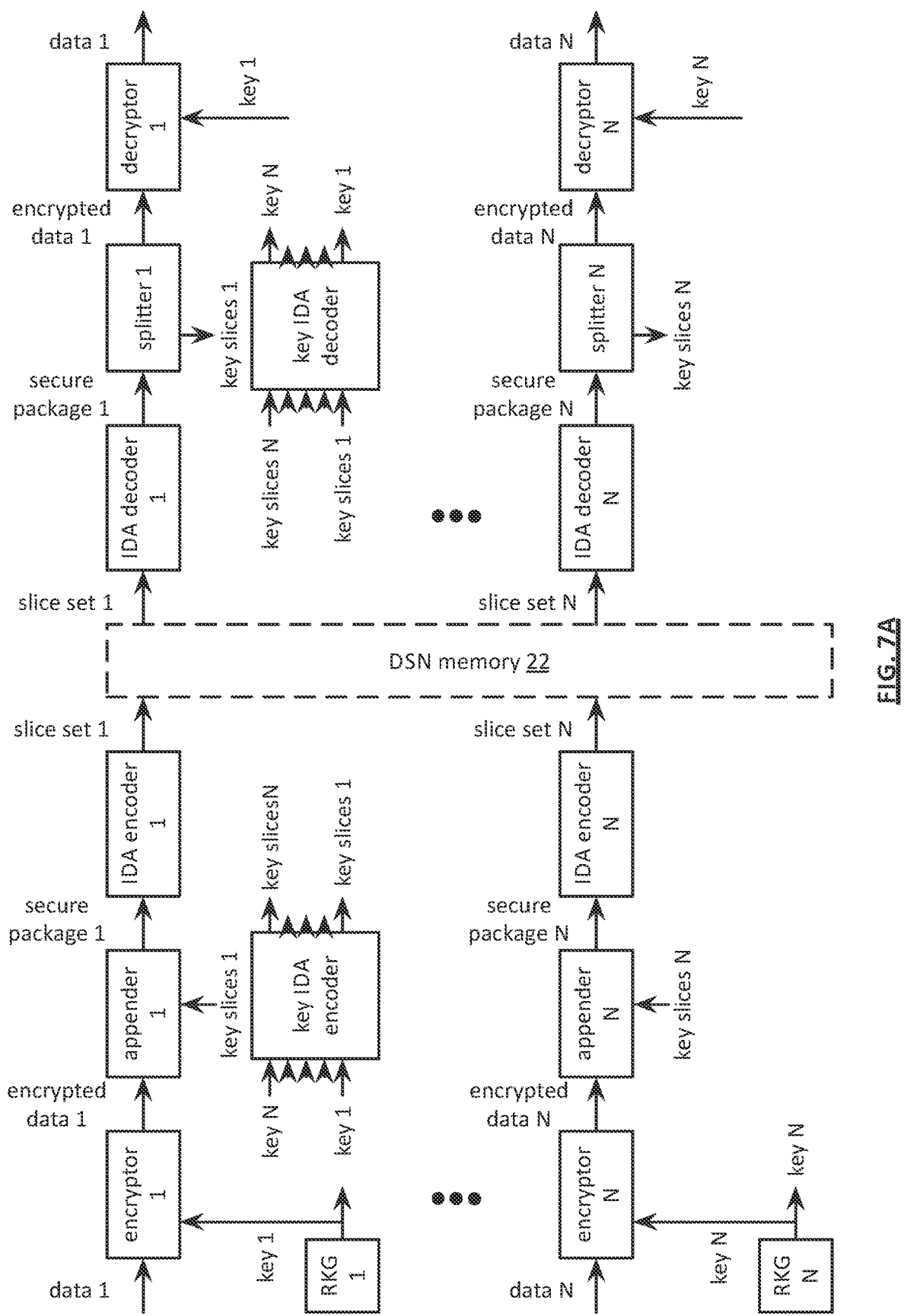
FIG. 7A is a schematic block diagram of another embodiment of a storage module in accordance with the invention.

FIG. 7A is a schematic block diagram of another embodiment of a storage module 84. The storage module 84 includes a plurality of encryptors 1-N, a plurality of appenders 1-N, a plurality of information dispersal algorithm (IDA) encoders 1-N, a plurality of random key generators (RKG) 1-N, a key IDA encoder, a plurality of IDA decoders 1-N, a plurality of splitters 1-N, a plurality of decryptors 1-N, and a key IDA decoder, all of which may be implemented as one or more modules. Data for storage in a dispersed storage network (DSN) memory 22 is presented as a plurality of data 1-N (e.g., data segments 1-N) to the storage module 84. The storage module 84 dispersed storage error encodes each data segment of the plurality of data segments 1-N to produce a plurality of sets 1-N of encoded data slices for storage in the DSN memory 22. The storage module 84 receives the plurality of sets 1-N of encoded data slices from the DSN memory 22 and dispersed storage error decodes each set of the plurality of sets 1-N of encoded data slices to reproduce the plurality of sets of data segments 1-N to reproduce the data.

RKGs 1-N generate a plurality of keys 1-N based on a key generating approach. The encryptors 1-N encrypt data segments 1-N to produce a plurality of encrypted data 1-N utilizing keys 1-N. The key IDA encoder dispersed storage error encodes the plurality of keys 1-N in accordance with dispersal parameters to produce key slices 1-N. The encoding includes one or more of selecting one or more keys of the plurality of keys 1-N to produce one or more key packages of a plurality of key packages and dispersed storage error encoding the plurality of key packages to produce the key slices 1-N. The key slices 1-N each include one or more encoded key slices. For example, key slices 1 includes a set of encoded key slices generated by dispersed storage error encoding a key package that includes key 1. As another example, key slices 2 includes at least some encoded key slices of a set of encoded key slices generated by dispersed storage error encoding a key package that includes key 2 and at least some encoded key slices of the set of encoded key slices generated by dispersed storage error encoding the key package that includes key 1.

The appenders 1-N append the plurality of key slices 1-N to the plurality of an encrypted data 1-N to produce a plurality of secure packages 1-N based on an appending approach. The appending may include one or more of selecting key slices of the plurality of key slices 1-N and appending selected key slices to corresponding encrypted data of the plurality of encrypted data 1-N to produce a secure package of the plurality of secure packages 1-N. The appending approach may be based on or more of a user identity (ID), a vault ID, a lookup, a predetermination, a security requirement, a data type indicator, a data size indicator, a data ID, a filename, and dispersal parameters. For example, appender 1 appends selected key slices 1 to encrypted data 1 when a dispersal parameter indicates to utilize a key slices 1 output of the key IDA encoder for encrypted data 1. As another example, appender 1 appends selected key slices 1 and key slices 2 to encrypted data 1 when a dispersal parameter indicates to utilize key slices associated with a first to data segments.

The plurality of IDA encoders 1-N dispersed storage error encode the plurality of secure packages 1-N in accordance with the dispersal parameters to produce the plurality of sets 1-N of encoded data slices. The plurality of sets 1-N of encoded data slices are sent to the DSN memory 22 for storage therein. The plurality of IDA decoders 1-N receive the plurality of sets 1-N of encoded data slices from the DSN memory 22 and dispersed storage error decode the plurality of sets 1-N of encoded data slices in accordance with the dispersal parameters to reproduce the plurality of sets of secure packages 1-N.

The splitters 1-N splits the secure packages 1-N into the plurality of encrypted data 1-N and the plurality of key slices 1-N in accordance with a splitting approach. The splitting approach may be based on or more of the user identity (ID), the vault ID, a lookup, a predetermination, a security requirement, the data type indicator, the data size indicator, the data ID, the filename, and the dispersal parameters. For example, splitter 1 splits secure package 1 into encrypted data 1 and key slices 1 based on a dispersal parameter that indicates that key slices 1 was appended to encrypted data 1. As another example, splitter 2 splits secure package 2 into encrypted data 2 and key slices 1-2 based on a key slices selection table lookup.

The key IDA decoder dispersed storage error decodes the plurality of key slices 1-N in accordance with dispersal parameters to reproduce keys 1-N. The decoding includes one or more of selecting one or more key slices of the plurality of key slices 1-N to produce one or more key slice packages of a plurality of key slice packages and dispersed storage error decoding the plurality of key slice packages to reproduce keys 1-N. For example, key slices 1 are dispersed storage error decoded to reproduce key 1. As another example, key slices 1 and 2 are dispersed storage error decoded to reproduce key 1.

The plurality of decryptors 1-N decrypt the plurality of encrypted data 1-N utilizing the plurality of reproduced keys 1-N to reproduce data 1-N to reform the data. For example, decryptor 3 decrypts encrypted data segment 3 utilizing reproduced key 3 to reproduce data 3.

FIG. 7B is a flowchart illustrating another example of encoding data. The method begins with step 180 where a processing module (e.g., of a dispersed storage processing module, of a storage module) encrypts a plurality of data segments of data utilizing a plurality of keys to produce a plurality of encrypted data segments. The method continues at step 182 where the processing module dispersed storage error encodes the plurality of keys to produce one or more sets of encoded key slices. The encoding includes one or more of selecting one or more keys of the plurality of keys to produce one or more key packages of a plurality of key packages and dispersed storage error encoding the plurality of key packages to produce the one of more sets of encoded key slices.

The method continues at step 184 where the processing module, for each encrypted data segment of the plurality of encrypted data segments, appends one or more encoded key slices of the one or more sets of encoded key slices to produce a corresponding secure package of a plurality of secure packages based on an appending approach. The appending may include one or more of selecting encoded key slices of the one of more sets of encoded key slices and appending selected key slices to corresponding encrypted data of the plurality of encrypted data to produce a secure package of the plurality of secure packages. The method continues at step 186 where the processing module dispersed storage error encodes the plurality of secure packages to produce a plurality of sets of encoded data slices.

FIG. 7C is a flowchart illustrating another example of decoding data. The method begins with step 188 where a processing module (e.g., of a dispersed storage processing module, of a storage module) dispersed storage error decodes a plurality of sets of encoded data slices to reproduce a plurality of secure packages. The method continues at step 190 where the processing module, for each secure package of the plurality of secure packages, splits out one or more encoded key slices of one or more sets of encoded key slices and a corresponding encrypted data segment in accordance with a splitting approach. The splitting approach may be based on or more of a user identity (ID), a vault ID, a lookup, a predetermination, a security requirement, a data type indicator, a data size indicator, a data ID, a filename, and a dispersal parameter.

The method continues at step 192 where the processing module dispersed storage error decodes the one or more sets of encoded key slices to reproduce a plurality of keys in accordance with a dispersal parameter. The decoding includes one or more of selecting one or more key slices of the one or more sets of encoded of key slices to produce one or more key slice packages of a plurality of key slice packages and dispersed storage error decoding the plurality of key slice packages to reproduce the plurality of keys. The method continues at step 194 where the processing module decrypts the plurality of encrypted data segments utilizing the plurality of keys to reproduce a plurality of data segments to reproduce the data.

Figure 8A:
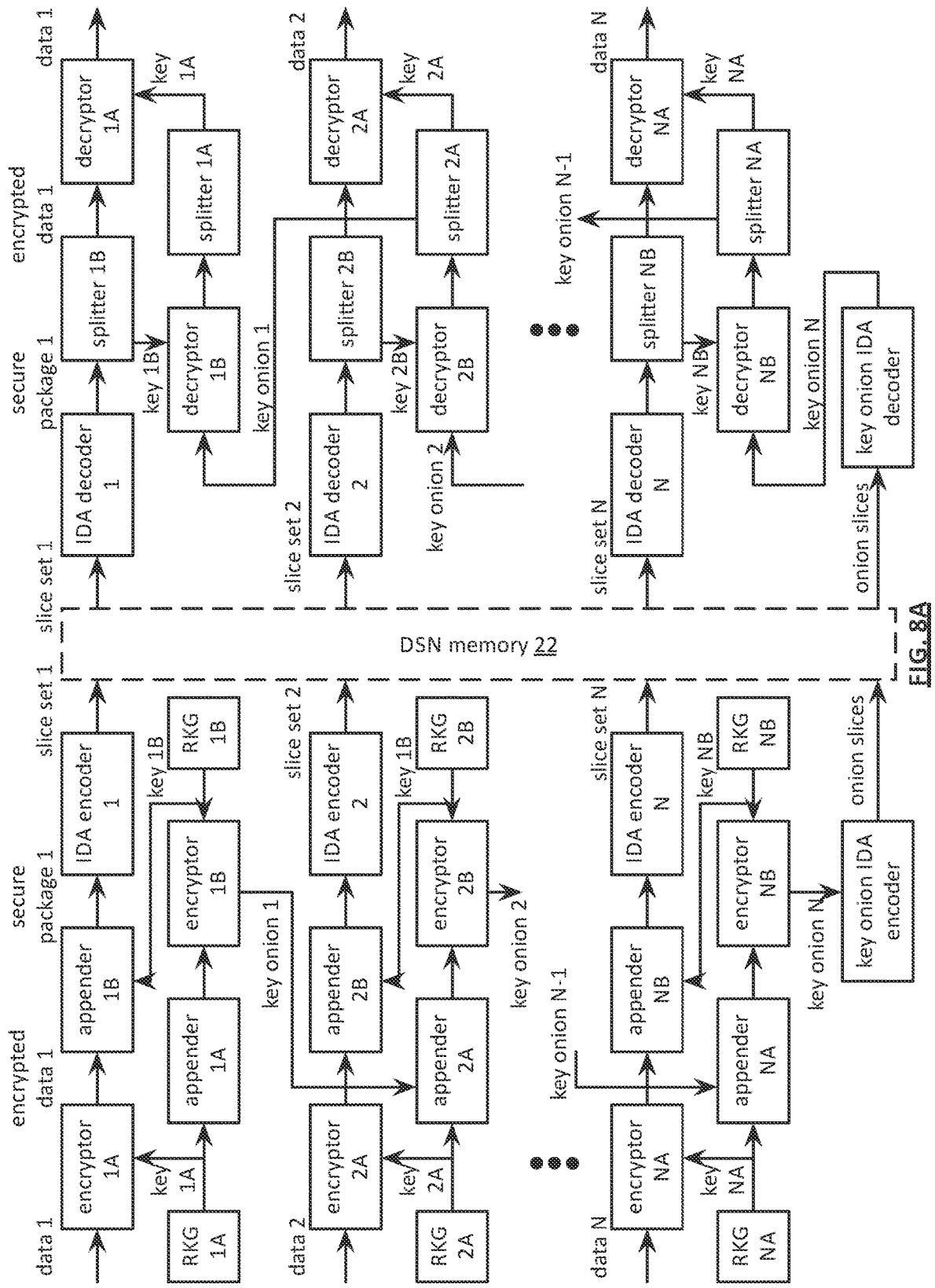
FIG. 8A is a schematic block diagram of another embodiment of a storage module in accordance with the invention.

FIG. 8A is a schematic block diagram of another embodiment of a storage module 84. The storage module 84 includes a plurality of encryptors 1A-NA and 1B-NB, a plurality of appenders 1A-NA and 1B-NB, a plurality of information dispersal algorithm (IDA) encoders 1-N, a plurality of random key generators (RKG) 1A-NA and 1B-NB, a key onion IDA encoder, a plurality of IDA decoders 1-N, a plurality of splitters 1A-NA and 1B-NB, a plurality of decryptors 1A-NA and 1B-NB, and a key onion IDA decoder, all of which may be implemented as one or more modules. Data for storage in a dispersed storage network (DSN) memory 22 is presented as a plurality of data 1-N (e.g., a plurality of data segments 1-N) to the storage module 84. The storage module 84 dispersed storage error encodes each data segment of the plurality of data segments 1-N to produce a plurality of sets 1-N of encoded data slices for storage in the DSN memory 22. The storage module 84 receives the plurality of sets 1-N of encoded data slices from the DSN memory 22 and dispersed storage error decodes each set of the plurality of sets 1-N of encoded data slices to reproduce the plurality of sets of data segments 1-N to reproduce the data.

RKGs 1A-NA generate a plurality of keys 1A-N based on a key generating approach. RKGs 1B-NB generate a plurality of keys 1B-NB based on the key generating approach and may retrieve keys 1B-NB from a local memory of one or more local memories associated with the encoding of each data of the plurality of data 1-N. The encryptors 1A-NA encrypt data segments 1-N to produce a plurality of encrypted data 1-N utilizing keys 1A-NA.

The appenders 1B-NB append the plurality of keys 1B-NB to the plurality of an encrypted data 1-N to produce a plurality of secure packages 1-N based on an appending approach. The appending may include one or more of selecting a key of the plurality of keys 1B-NB and appending the selected key to a corresponding encrypted data of the plurality of encrypted data 1-N to produce a secure package of the plurality of secure packages 1-N. The appending approach may be based on or more of a user identity (ID), a vault ID, a lookup, a predetermination, a security requirement, a data type indicator, a data size indicator, a data ID, a filename, and dispersal parameters. For example, appender 1B appends selected key 1B to encrypted data 1 when a dispersal parameter indicates to utilize a corresponding key for encrypted data 1. As another example, appender 1B appends selected key 2B to encrypted data 1 when a dispersal parameter indicates to utilize a key associated with a next data segment.

The appenders 1A-NA append a plurality of levels of post-encryption key onions 1 through N-1 to the plurality of keys 1A-NA to produce a plurality of levels of pre-encryption key onions 1 through N-1 based on an appending approach when a key of the plurality of keys 1A-NA is to be appended to a post-encryption key onion (e.g., no appending is required for a first level). A key onion includes one or more of a level indicator, a previous level encrypted key onion, a list of a plurality of levels, a next level indicator, a next level entity ID, a list of a plurality of entities wherein each entity is associated with at least one level of the plurality of levels, routing information (e.g., internet protocol (IP) addresses associated with the plurality of entities), and a corresponding level key that corresponds to the level indicator. The plurality of encryptors 1B-NB encrypt the plurality of levels of pre-encryption key onions 1 through N-1 utilizing the plurality of keys 1B-NB to produce the plurality of levels of post-encryption key onions 1 through N-1.

For example, a post-encryption key onion 2 (e.g., for level 2) includes pre-encryption key onion 2 content encrypted by encryptor 2B utilizing key 2B. The pre-encryption key onion 2 content includes key 2A appended by appender 2B with post-encryption key onion 1 (e.g., encrypted utilizing key 1B associated with level 1), a level 2 indicator, and a next level indicator of 3. As another example, for the first level, a post-encryption key onion 1 (e.g., for level 1) includes pre-encryption key onion 1 content encrypted by encryptor 1B utilizing key 1B, wherein the pre-encryption key onion 1 content includes key 1A appended by appender 1A with a level 1 indicator, and a next level indicator of 2. As yet another example, a post-encryption key onion N (e.g., for level N) includes pre-encryption key onion N-1 content encrypted by encryptor NB utilizing key (N-1)B. The pre-encryption key onion N-1 content includes key NA appended by appender NA with post-encryption key onion N-1 (e.g., encrypted utilizing key (N-1)B associated with level N-1), a level N indicator, and a next level indicator of none.

A final level encryptor of the plurality of encryptors 1B-NB provides a final level key onion to the key onion IDA encoder. The key onion IDA encoder dispersed storage error encodes the final level key onion to produce one or more sets of onion slices for storage in the DSN memory 22. For example, encryptor NB provides key onion N to the key onion IDA encoder. The key onion IDA encoder dispersed storage error encodes key onion N to produce the one of more sets of onion slices for storage in the DSN memory 22.

The plurality of IDA encoders 1-N dispersed storage error encode the plurality of secure packages 1-N in accordance with the dispersal parameters to produce the plurality of sets 1-N of encoded data slices. The plurality of sets 1-N of encoded data slices are sent to the DSN memory 22 for storage therein. The plurality of IDA decoders 1-N receive the plurality of sets 1-N of encoded data slices from the DSN memory 22 and dispersed storage error decode the plurality of sets 1-N of encoded data slices in accordance with the dispersal parameters to reproduce the plurality of sets of secure packages 1-N. The key onion IDA decoder retrieves the one or more sets of onion slices from the DSN memory 22 and dispersed storage error decodes the one or more sets of onion slices to reproduce a final level key onion. For example, the key onion IDA decoder retrieves the one or more sets of onion slices from the DSN memory and dispersed storage error decodes the one of more sets of onion slices to reproduce key onion N for presentation to decryptor NB of the plurality of decryptors 1B-NB.

The splitters 1B-NB splits the plurality of secure packages 1-N into the plurality of encrypted data 1-N and the plurality of keys 1B-NB in accordance with a splitting approach. The splitting approach may be based on or more of the user identity (ID), the vault ID, a lookup, a predetermination, a security requirement, the data type indicator, the data size indicator, the data ID, the filename, and the dispersal parameters. For example, splitter 1B splits secure package 1 into encrypted data 1 and key 1B based on a dispersal parameter that indicates that key 1B was appended to encrypted data 1. As another example, splitter 2B splits secure package 2 into encrypted data 2 and key 2B based on a key recovery table lookup. As yet another example, splitter 3B extracts encrypted data 3 from secure package 3 and retrieves key 3B from a local key memory based on a security requirement.

The plurality of decryptors 1B-NB decrypt the plurality of key onion levels 1-N utilizing the plurality of keys 1B-NB to reproduce a corresponding plurality of key onion content and the splitters 1A-NA split the plurality of key onion content to extract the plurality of keys 1A-NA and subsequent key onion levels N-1 through 1 provided to a subsequent level decryptor. When decoding the data, a first decrypting and splitting of a key onion starts with a highest level of key onion. For example, decryptor NB decrypts key onion N utilizing key NB to produce key onion content that is split by splitter NA to extract key onion N-1 and key NA. Next, splitter NA sends key onion N-1 to decryptor (N-1)B based on a next level recipient identifier of the key onion content. As another example, decryptor 2B decrypts key onion 2 utilizing key 2B to produce key onion content that is split by splitter 2A to extract key onion 1 and key 2A. Next, splitter 2A sends key onion 1 to decryptor 1B based on a next level recipient identifier of the canyon content. When decoding a data segment that was encoded first, the splitting of the corresponding key onion content includes extracting a corresponding key without extracting a subsequent key onion level. For example, decryptor 1B decrypts key onion 1 utilizing key 1B to produce key onion content that is split by splitter 1A to extract key 1A.

The plurality of decryptors 1-N decrypt the plurality of encrypted data 1-N utilizing the plurality of reproduced keys 1-N to reproduce data 1-N to reform the data. For example, decryptor 3 decrypts encrypted data segment 3 utilizing reproduced key 3 to reproduce data 3.

FIG. 8B is a flowchart illustrating another example of encoding data, which includes similar steps to FIG. 7B. The method begins with step 196 where a processing module (e.g., of a dispersed storage processing module, of a storage module) encrypts a plurality of data segments of data utilizing a first plurality of keys to produce a plurality of encrypted data segments. For example, the processing module encrypts data segment 3 utilizing key 3A of a plurality of keys 1A-NA to produce an encrypted data segment 3.

The method continues at step 198 where the processing module, for each encrypted data segment of the plurality of encrypted data segments, appends a corresponding key of a second plurality of keys to produce a corresponding secure package of a plurality of secure packages. The appending may include one or more of selecting a key of the plurality of keys 1B-NB and appending the selected key to a corresponding encrypted data of the plurality of encrypted data 1-N to produce a secure package of the plurality of secure packages 1-N. The appending approach may be based on or more of a user identity (ID), a vault ID, a lookup, a predetermination, a security requirement, a data type indicator, a data size indicator, a data ID, a filename, and dispersal parameters. For example, the processing module appends a key 3B to the encrypted data segment 3 to produce a secure package 3. The method continues with step 186 of FIG. 7B where the processing module dispersed storage error encodes the plurality of secure packages to produce a plurality of sets of encoded data slices and the sends the plurality of sets of encoded data slices to a dispersed storage network (DSN) memory for storage therein.

The method continues at step 202 where the processing module, for each key of the first plurality of keys, encrypts an appending of the key and another level key onion utilizing a corresponding key of the second plurality of keys to produce a corresponding level key onion in accordance with dispersal parameters. For example, the processing module appends a key 2A of the first plurality of keys to a key onion 1 (e.g., another level key onion) to produce onion content, encrypts the onion content utilizing key 2B of the second plurality of keys (e.g., the corresponding level key) to produce a key onion 2 (e.g., a corresponding level key), and sends the key onion 2 to a module affiliated with a next level of a plurality of key onion levels (e.g., based on a next level entity ID). The method continues at step 204 where the processing module dispersed storage error encodes a final level key onion of the plurality of key onion levels to produce one or more sets of encoded onion slices and outputs the one or more sets of encoded onion slices to the DSN memory for storage therein.

FIG. 8C is a flowchart illustrating another example of decoding data, which includes similar steps to FIG. 7C. The method begins at step 206 where a processing module (e.g., of a dispersed storage processing module, of a storage module) dispersed storage error decodes one or more sets of encoded onion slices to reproduce a final level key onion of a plurality of key onion levels. The method continues with step 188 of FIG. 7C where the processing module dispersed storage error decodes a plurality of sets of encoded data slices to reproduce a plurality of secure packages.

The method continues at step 210 where the processing module, for each secure package of the plurality of secure packages, splits out a corresponding key of a second plurality of keys and a corresponding encrypted data segment of a plurality of encrypted data segments in accordance with a splitting approach. For example, the processing module splits out a key 2B of the second plurality of keys and encrypted data 2 from a secure package 2.

The method continues at step 212 where the processing module, for each encrypted data segment of the plurality of encrypted data segments, splits out a corresponding key of the first plurality of keys and another level key onion of a decrypted corresponding level key onion decrypted utilizing a corresponding key of the second plurality of keys. For example, the processing module decrypts key onion 2 (e.g., decrypted corresponding level key onion) utilizing key 2B of the second plurality of keys (e.g., a corresponding key) to produce key onion content and splits out a key 2A (e.g., the corresponding key of the first plurality of keys) and key onion 1 (e.g., the another level key onion) from the key onion content.

The method continues at step 214 where the processing module decrypts the plurality of encrypted data segments utilizing the first plurality of keys to produce a plurality of data segments to reproduce data. For example, the processing module decrypts encrypted data segment 7 utilizing reproduced key 7A to reproduce data segment 7. Next, the processing module aggregates the plurality of data segments to reproduce the data.

Figure 9A:
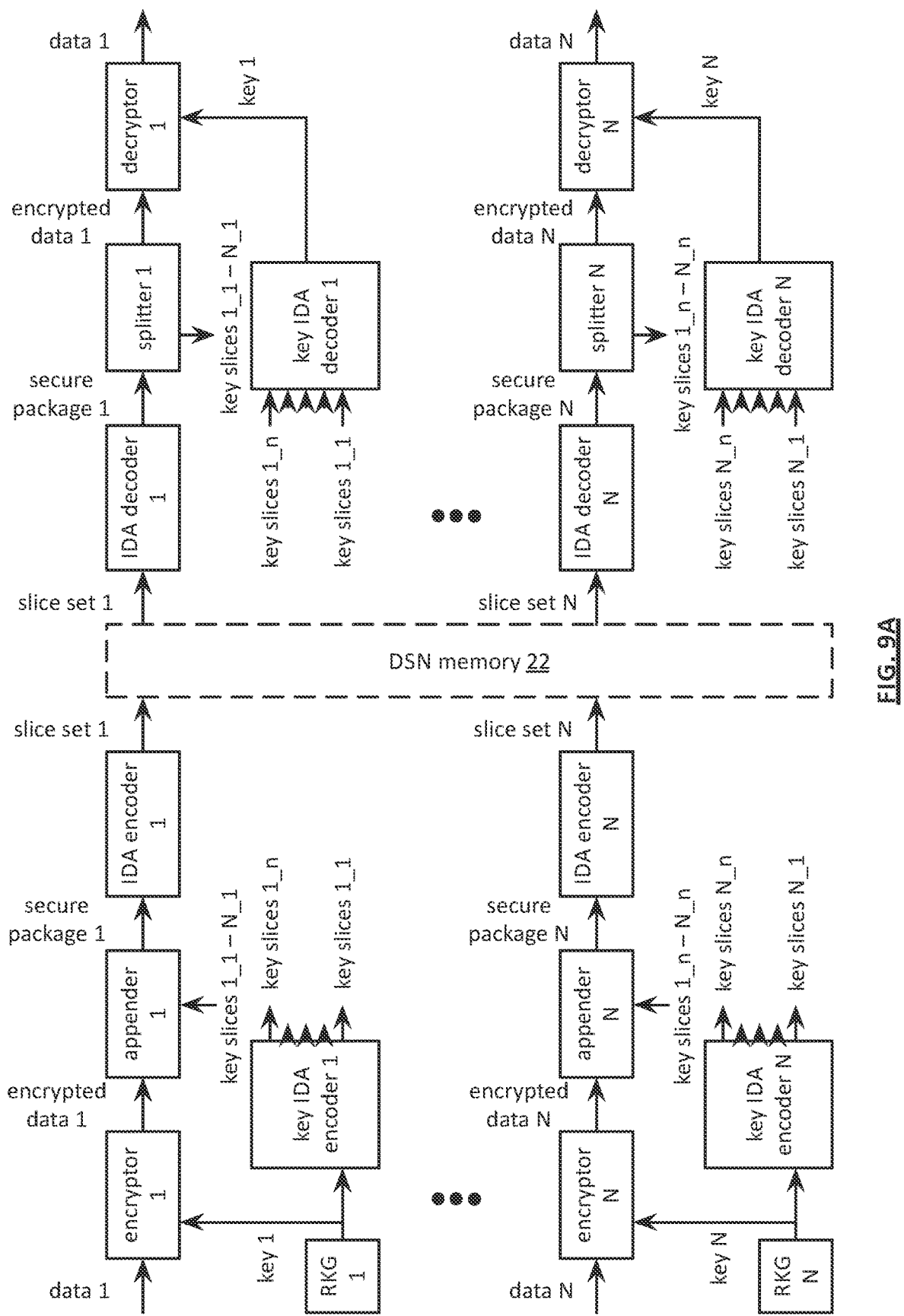
FIG. 9A is a schematic block diagram of another embodiment of a storage module in accordance with the invention.

FIG. 9A is a schematic block diagram of another embodiment of a storage module 84. The storage module 84 includes a plurality of encryptors 1-N, a plurality of appenders 1-N, a plurality of information dispersal algorithm (IDA) encoders 1-N, a plurality of random key generators (RKG) 1-N, a plurality of key IDA encoders 1-N, a plurality of IDA decoders 1-N, a plurality of splitters 1-N, a plurality of decryptors 1-N, and a plurality of key IDA decoders 1-N, all of which may be implemented as one or more modules. Data for storage in a dispersed storage network (DSN) memory 22 is presented as a plurality of data 1-N (e.g., a plurality of data segments 1-N) to the storage module 84. The storage module 84 dispersed storage error encodes each data segment of the plurality of data segments 1-N to produce a plurality of sets 1-N of encoded data slices for storage in the DSN memory 22. The storage module 84 receives the plurality of sets 1-N of encoded data slices from the DSN memory 22 and dispersed storage error decodes each set of the plurality of sets 1-N of encoded data slices to reproduce the plurality of sets of data segments 1-N to reproduce the data.

RKGs 1-N generate a plurality of keys 1-N based on a key generating approach. The encryptors 1-N encrypt data segments 1-N to produce a plurality of encrypted data 1-N utilizing keys 1-N in accordance with dispersal parameters. The plurality of key IDA encoders 1-N dispersed storage error encode the plurality of keys 1-N in accordance with dispersal parameters to produce a plurality of one or more sets of key slices. The plurality of one or more sets of key slices includes one or more sets of key slices 1_1-1_n through one or more sets of key slices N_1-N_n. For example, key IDA encoder 3 dispersed storage error encodes key 3 to produce key slices 3_1-3_n that includes two sets of key slices. For instance, key slices 3_1 includes two slices of a common pillar 1, key slices 3_2 includes two slices of a common pillar 2, through key slices 3_n that includes two slices of a common pillar n, wherein n represents a key slice pillar width of the dispersal parameters associated with encoding key 3.

The appenders 1-N append the plurality of one or more sets of key slices to the plurality of encrypted data 1-N to produce a plurality of secure packages 1-N based on an appending approach. The appending includes the one or more of selecting key slices of the plurality of one or more sets of key slices and appending selected key slices to corresponding encrypted data of the plurality of encrypted data 1-N to produce a secure package of the plurality of secure packages 1-N. The appending approach may be based on or more of a user identity (ID), a vault ID, a lookup, a predetermination, a security requirement, a data type indicator, a data size indicator, a data ID, a filename, and dispersal parameters. For example, appender 1 appends selected key slices 1_1-N_1 to encrypted data 1 when a dispersal parameter indicates to append all key slices of a common pillar 1 of the plurality of one or more sets of key slices for encrypted data 1.

The plurality of IDA encoders 1-N dispersed storage error encode the plurality of secure packages 1-N in accordance with the dispersal parameters to produce the plurality of sets 1-N of encoded data slices. The plurality of sets 1-N of encoded data slices are sent to the DSN memory 22 for storage therein. The plurality of IDA decoders 1-N receive the plurality of sets 1-N of encoded data slices from the DSN memory 22 and dispersed storage error decode the plurality of sets 1-N of encoded data slices in accordance with the dispersal parameters to reproduce the plurality of sets of secure packages 1-N.

The splitters 1-N splits the secure packages 1-N into the plurality of encrypted data 1-N and the plurality of one or more sets of key slices in accordance with a splitting approach. The splitting approach may be based on or more of the user identity (ID), the vault ID, a lookup, a predetermination, a security requirement, the data type indicator, the data size indicator, the data ID, the filename, and the dispersal parameters. For example, splitter 1 splits secure package 1 into encrypted data 1 and key slices 1_1-N_1 based on a dispersal parameter that indicates that key slices 1_1-N_1 (e.g., of a common pillar 1) were appended to encrypted data 1.

The plurality of key IDA decoders dispersed storage error decodes the plurality of one or more sets of key slices in accordance with dispersal parameters to reproduce the plurality of keys 1-N. For each key IDA decoder, the decoding includes one or more of selecting corresponding one or more sets of key slices of the plurality one more sets of key slices and dispersed storage error decoding the corresponding one or more sets of key slices to reproduce a corresponding key of the plurality of keys 1-N. For example, key IDA decoder N selects key slices N_1-N_n as the corresponding one more sets of key slices and dispersed storage error decodes key slices N_1-N_n to produce a key N of the plurality of keys 1-N. The plurality of decryptors 1-N decrypt the plurality of encrypted data 1-N utilizing the plurality of reproduced keys 1-N to reproduce data 1-N to reform the data. For example, decryptor 9 decrypts encrypted data segment 9 utilizing reproduced key 9 to reproduce a data segment 9 of a plurality of data segments. Next, the processing module aggregates the plurality of data segments to reproduce data.

FIG. 9B is a flowchart illustrating another example of encoding data, which includes similar steps to FIG. 7B. The method begins with step 180 of FIG. 7B where a processing module (e.g., of a dispersed storage processing module, of a storage module) encrypts a plurality of data segments of data utilizing a plurality of keys to produce a plurality of encrypted data segments. The method continues at step 218 where the processing module, for each key of the plurality of keys, dispersed storage error encodes in accordance with dispersal parameters the key to produce one or more sets of corresponding encoded key slices of a plurality of one or more sets of encoded key slices.

The method continues at step 220 where the processing module, for each of a key encoding pillar width number of encrypted data segments of the plurality of encrypted data segments, appends at least a key encoding pillar width number of encoded key slices of the plurality of one more sets of encoded key slices to produce a corresponding secure package of a plurality of secure packages. The appending includes one or more of selecting encoded key slices of the plurality of one of more sets of encoded key slices and appending the selected key slices to corresponding encrypted data segments of the key encoding pillar width number of encrypted data segments to produce the plurality of secure packages. For example, the processing module appends a key slice of each of the plurality of one or more sets of encoded key slices, wherein each appended key slice is of a common pillar.

The method continues at step 222 where the processing module, for each data segment of remaining encrypted data segments, provides the data segment to produce a corresponding secure package of the plurality of secure packages (e.g., without appending key slices). The method continues with step 186 of FIG. 7B where the processing module dispersed storage error encodes the plurality of secure packages to produce a plurality of sets of encoded data slices and stores the plurality of sets of encoded data slices in a dispersed storage network memory.

FIG. 9C is a flowchart illustrating another example of decoding data, which includes similar steps to FIG. 7C. The method begins with step 188 of FIG. 7C where a processing module (e.g., of a dispersed storage processing module, of a storage module) dispersed storage error decodes a plurality of sets of encoded data slices to reproduce a plurality of secure packages. The method continues at step 228 where the processing module, for each of a key encoding pillar width number of secure packages of the plurality of secure packages, splits out at least a key encoding pillar width number of key slices of a plurality of one or more sets of encoded key slices and a corresponding encrypted data segment of a plurality of encrypted data segments in accordance with a splitting approach. The splitting approach may be based on or more of a user identity (ID), a vault ID, a lookup, a predetermination, a security requirement, a data type indicator, a data size indicator, a data ID, a filename, and a dispersal parameter.

The method continues at step 230 where the processing module, for each secure package of remaining secure packages, provides the secure package as a corresponding encrypted data segment of the plurality of encrypted data segments. The method continues at step 232 where the processing module, for each encrypted data segment of the plurality of encrypted data segments, dispersed storage error decodes the one or more sets of encoded key slices to reproduce a corresponding key of a plurality of keys in accordance with a dispersal parameter. The decoding includes one or more of selecting one or more sets of encoded key slices of the plurality of one or more sets of encoded of key slices to produce one or more key slice packages of a plurality of key slice packages and dispersed storage error decoding the plurality of key slice packages to reproduce the plurality of keys. The method continues with step 194 of FIG. 7C where the processing module decrypts the plurality of encrypted data segments utilizing the plurality of keys to reproduce a plurality of data segments to reproduce the data. For example, the processing module decrypts encrypted data segment 10 utilizing reproduced key 10 to reproduce data segment 10. Next, the processing module aggregates the plurality of data segments to reproduce the data.

Figure 10:
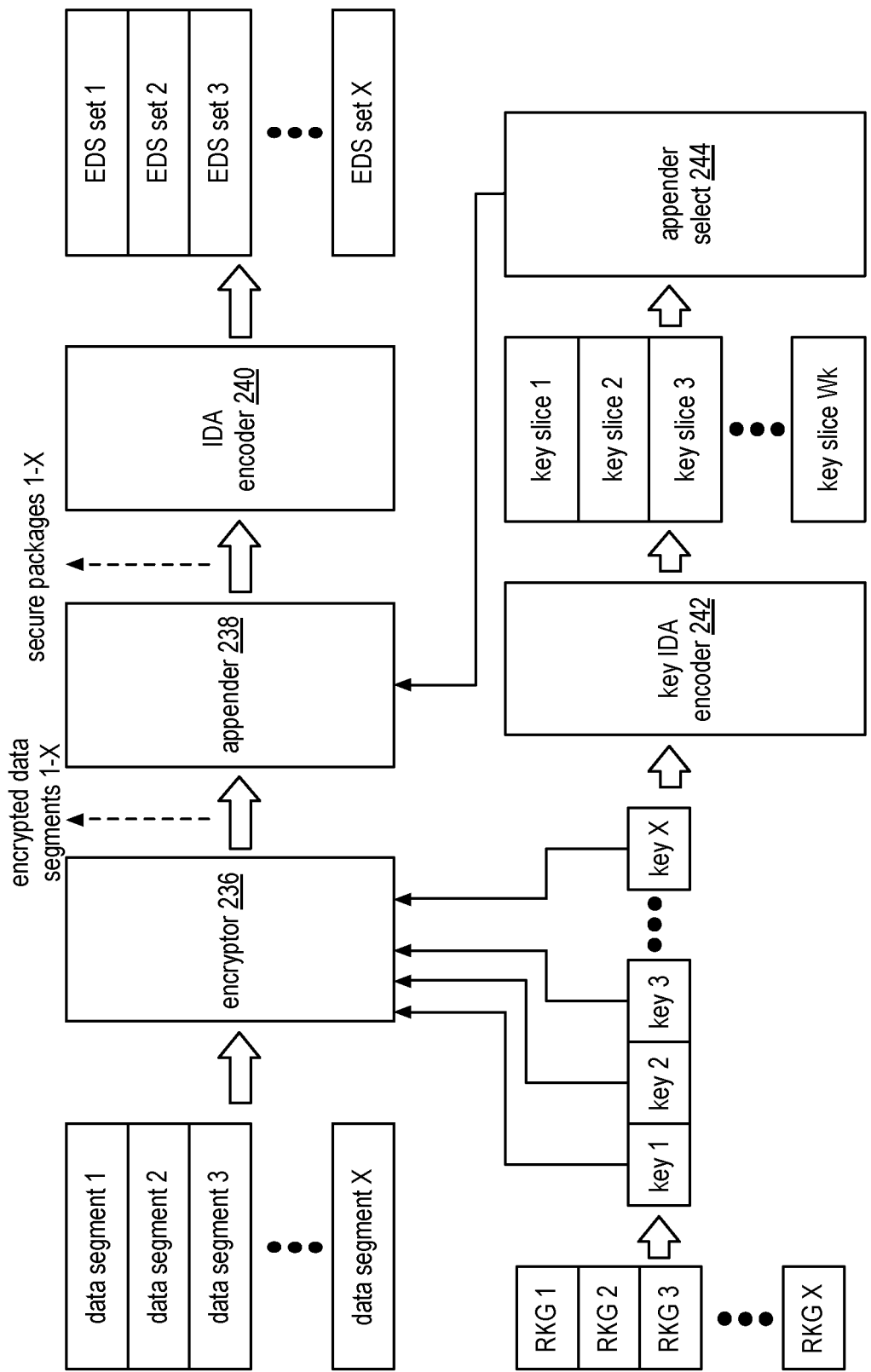
FIG. 10 is a schematic block diagram of a computing device of the dispersed storage network (DSN) in accordance with the invention.

FIG. 10 is a schematic block diagram of a computing device 234 of the dispersed storage network (DSN). Computing device 234 includes encryptor 236, appender 238, information dispersal algorithm (IDA) encoder 240, key IDA encoder 242, and appender select 244, all of which may be implemented as one or more modules. Computing device 234 includes a storage module that includes a distributed/dispersed storage (DS) module. Encryptor 236 may include more than one encryptor (e.g., X number of encryptors for X data segments). Appender 238 may include more than one appender (e.g., X number of appenders for X data segments). IDA encoder 240 may include more than one IDA encoder (e.g., X number of IDA encoders for X data segments).

In an example of operation, computing device 234 receives a data object for secure storage in a set of storage units of the DSN. Computing device 234 segments the data object in X number of data segments. Random key generators (RKGs) 1-X generate keys 1-X based on a key generating approach and may retrieve keys 1-X from a local memory of one or more local memories associated with the encoding of each data segment of data segments 1-X. The key generating approach may be based on one or more of a key seed, a pseudorandom sequence, a random number generator, a predetermined list, a lookup, a private key retrieval, and public-key retrieval, a public/private key pair generation, and a key generation algorithm.

Encryptor 236 encrypts data segments 1-X with keys 1-X to produce encrypted data segments 1-X. For example, data segment 1 is encrypted with key 1 to produce encrypted data segment 1, data segment 2 is encrypted with key 2 to produce encrypted data segment 2, data segment 3 is encrypted with key 3 to produce encrypted data segment 3, etc. The key IDA encoder 242 dispersed storage error encodes keys 1-X using a key dispersed storage error encoding function in accordance with dispersal parameters to produce a set of encoded key slices 1-Wk. Key IDA encoder 242 dispersal parameters include the pillar width number (Wk) (i.e., how many encoded key slices are in the set of encoded key slices), a decode threshold number (i.e., how many encoded key slices are needed to recover keys 1-X), and an error encoding function (e.g., Reed-Solomon or other forward error correction (FEC) scheme, information dispersal algorithm, other error correction coding, etc.).

Appender select 244 selects at least a decode threshold number of encoded key slices to append to at least some of the encrypted data segments in accordance with an appending approach. The appending approach may include selecting encoded key slices and an encrypted data segment for appending at random, based on a pseudo-random approach, or any function such that no one encrypted data segment includes at the least the decode threshold number of encoded key slices. The appending approach may be included as a dispersal parameter set in the key IDA encoder 242. Appender select 244 selects the encoded key slices for appending and instructs appender 238 on how to append the encoded key slices to the encrypted data segments 1-X. Appender 238 appends at least a decode threshold number of encoded key slices to at least some of the encrypted data segments to produce secure packages 1-X.

IDA encoder 240 dispersed storage error encodes secure packages 1-X using a dispersed storage error encoding function to produce sets of encoded data slices (EDS sets 1-X). For example, a first secure package of secure packages 1-X is dispersed storage error encoded using the dispersed storage error encoding function to produce EDS set 1 of the sets of encoded data slices 1-X. The dispersed storage error encoding function includes dispersal parameters (i.e., pillar width number, a decode threshold number, and an error encoding function (e.g., Reed-Solomon or other forward error correction (FEC) scheme, information dispersal algorithm, other error correction coding, etc.)) that can differ from the dispersal parameters of the key dispersed storage error encoding function. Computing device 234 sends the sets of encoded data slices to the set of storage devices of the DSN for storage therein.

FIGS. 11A-11B are schematic block diagrams of examples of secure packages. FIG. 11A depicts secure packages 246. Secure packages 246 include encrypted data segments 1-5 (i.e., the data object has been segmented into data segments 1-5 and each data segment has been encrypted by a corresponding key 1-5) where encrypted data segment 1 is appended with key slice 1, encrypted data segment 3 is appended with key slice 2, and encrypted data segment 5 is appended with key slice 3. Keys 1-5 have been dispersed storage error encoded using a key dispersed storage error encoding function to produce a set of encoded key slices (key slices 1-5). In this example, the key dispersed storage error encoding function includes a pillar width number of 5 and a decode threshold number of 3. As such, only 3 key slices need to be appended to at least some of the encrypted data segments in order to recover keys 1-5. Here, an appending approach specified appending the decode threshold number (3) of encoded key slices such that every other encrypted data segment is appended with an encoded key slice of encoded key slices 1-3.

FIG. 11B depicts secure packages 248. Secure packages 248 include encrypted data segments 1-5 (i.e., the data object has been segmented into data segments 1-5 and each data segment has been encrypted by a corresponding key 1-5) where encrypted data segment 1 is appended with key slices 1 and 3, encrypted data segment 3 is appended with key slice 4, encrypted data segment 4 is appended with key slice 5, and encrypted data segment 5 is appended with key slice 2. Keys 1-5 have been dispersed storage error encoded using a key dispersed storage error encoding function to produce a set of encoded key slices (encoded key slices 1-8). In this example, the key dispersed storage error encoding function includes a pillar width number of 8 and a decode threshold number of 5. As such, only 5 key slices need to be appended to at least some of the encrypted data segments in order to recover keys 1-5. Here, an appending approach specified appending the decode threshold number (5) of encoded key slices in a random sequence while ensuring that no one encrypted data segment is appended with the decode threshold number (5) of encoded key slices.

Figure 12:
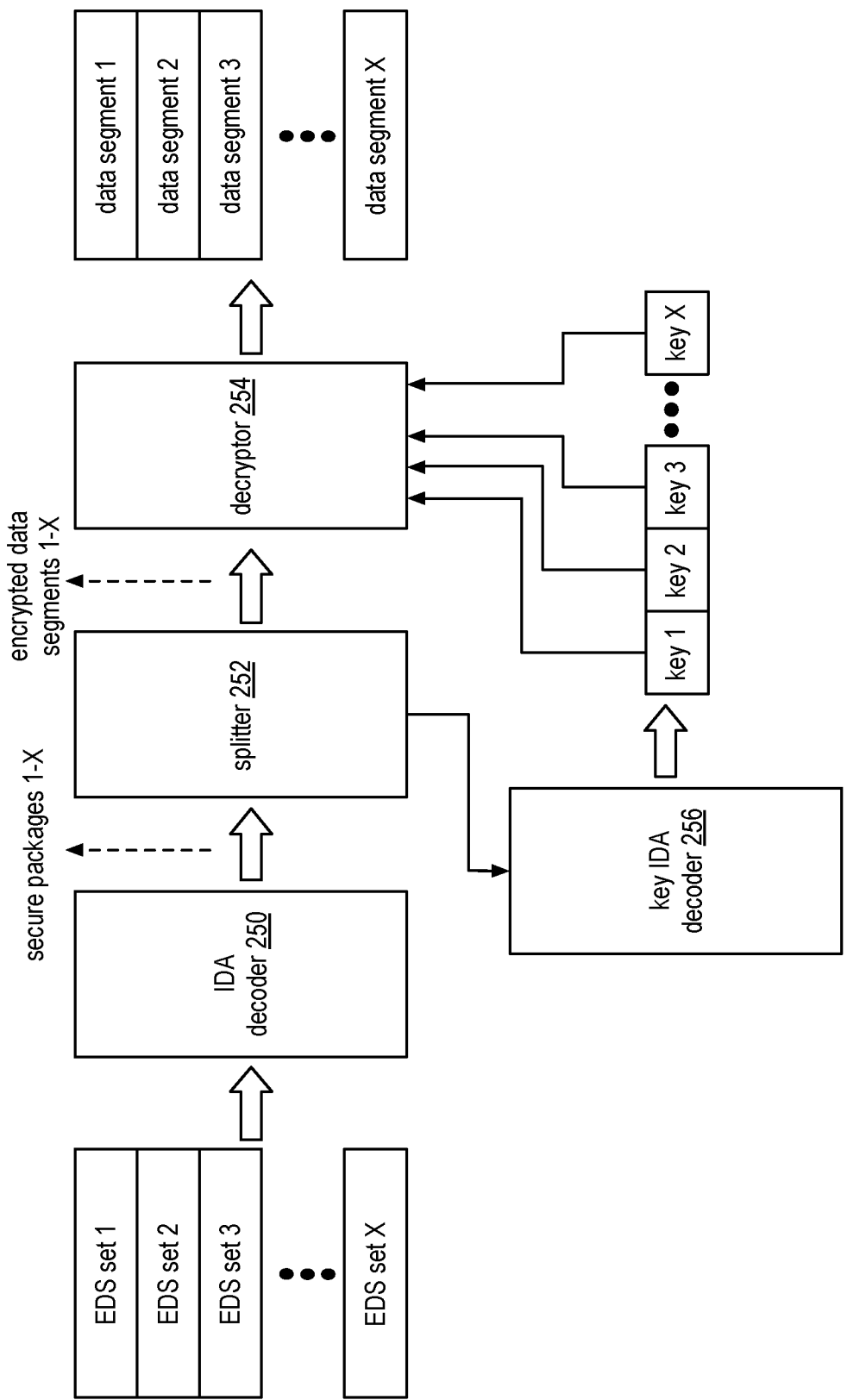
FIG. 12 is a schematic block diagram of a computing device of the dispersed storage network (DSN) in accordance with the invention.

FIG. 12 is a schematic block diagram of computing device 234 of the dispersed storage network (DSN). Computing device 234 includes information dispersal algorithm (IDA) decoder 250, key IDA decoder 256, splitter 252, and decryptor 254, all of which may be implemented as one or more modules. Decryptor 254 may include more than one decryptor (e.g., X number of decryptors for X data segments). Splitter 252 may include more than one splitter (e.g., X number of splitters for X data segments). IDA decoder 250 may include more than one IDA decoder (e.g., X number of IDA decoders for X data segments).

In an example of operation, computing device 234 retrieves the sets of encoded data slices (EDS sets 1-X) from the set of storage devices of the DSN. IDA decoder 250 dispersed storage error decodes the sets of encoded data slices using a dispersed storage error decoding function having the same dispersal parameters as the dispersed storage error encoding function to produce secure packages 1-X. Splitter 252 splits the at least the decode threshold number of encoded key slices of the set of encoded key slices from the secure packages 1-X to produce encrypted data segments 1-X. For example, key slice 1 of the at least the decode threshold number of encoded key slices is split from secure package 1 of secure packages 1-X to produce encrypted data segment 1 of encrypted data segments 1-X.

Key IDA decoder 256 dispersed storage error decodes the at least the decode threshold number of encoded key slices using a key dispersed storage error decoding function having the same dispersal parameters as the key dispersed storage error encoding function to produce encryption keys 1-X. Decryptor 254 decrypts encrypted data segments 1-X using encryption keys 1-X to produce data segments 1-X. For example, key 1 is used to decrypt encrypted data segment 1 to produce data segment 1. The computing device 234 de-segments data segments 1-X to produce the data object.

Figure 13:
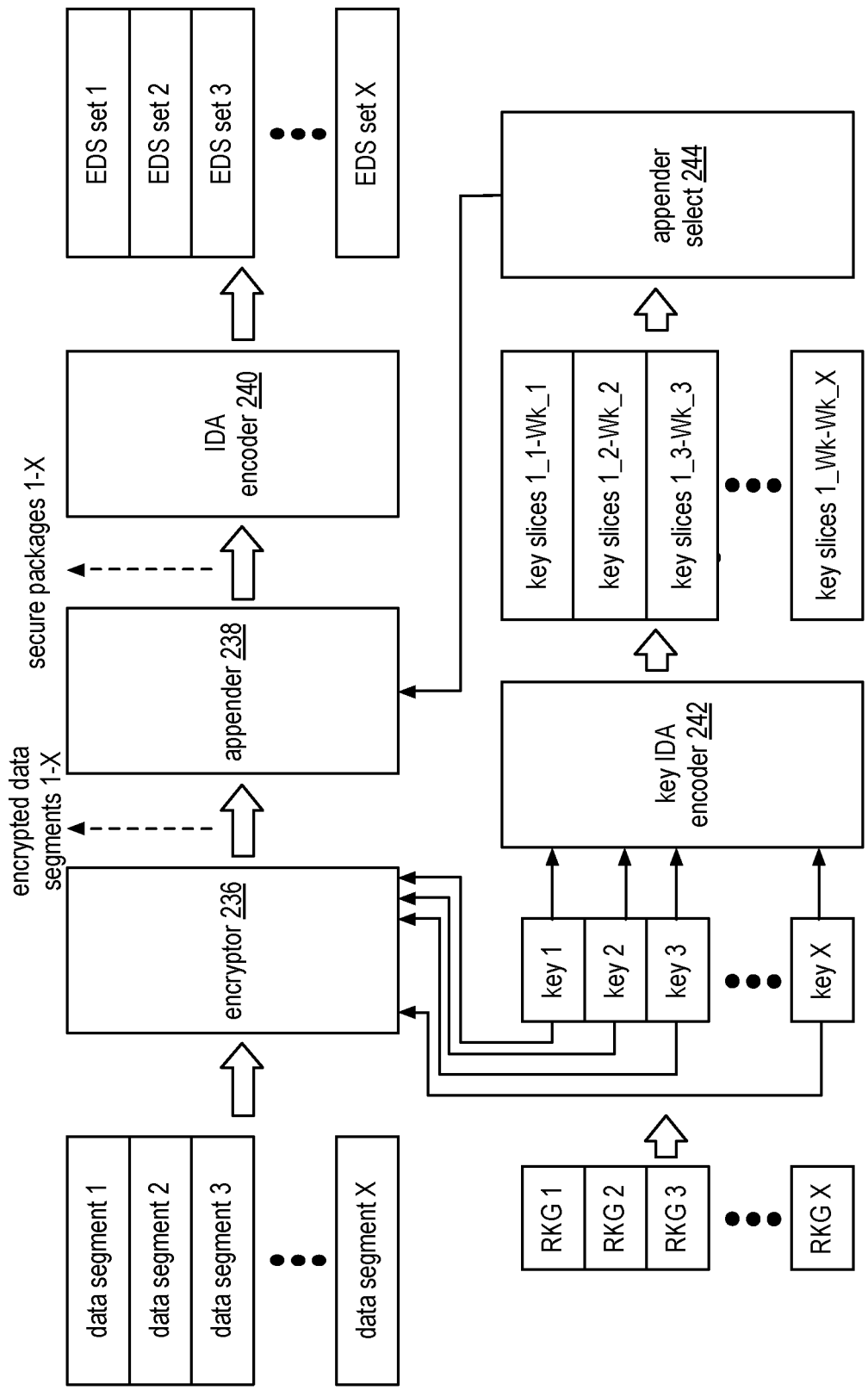
FIG. 13 is a schematic block diagram of a computing device of the dispersed storage network (DSN) in accordance with the invention.

FIG. 13 is a schematic block diagram of computing device 234 of the dispersed storage network (DSN). Computing device 234 includes encryptor 236, appender 238, information dispersal algorithm (IDA) encoder 240, key IDA encoder 242, and appender select 244, all of which may be implemented as one or more modules. Computing device 234 includes a storage module that includes a distributed/dispersed storage (DS) module. Encryptor 236 may include more than one encryptor (e.g., X number of encryptors for X data segments). Appender 238 may include more than one appender (e.g., X number of appenders for X data segments). IDA encoder 240 may include more than one IDA encoder (e.g., X number of IDA encoders for X data segments). Key IDA encoder 242 may include more than one key IDA encoder (e.g., X number of key IDA encoder for X keys).

In an example of operation, computing device 234 operates similarly to FIG. 10 however each key 1-X is dispersed storage error encoded using a key dispersed storage error encoding function in accordance with dispersal parameters to produce sets of encoded key slices (key slices 1_1-Wk_1, key slices 1_2-Wk_2, key slices 1_3-Wk_3 through key slices 1_Wk-Wk_X). Key IDA encoder 242 dispersal parameters include the pillar width number Wk (i.e., how many encoded key slices are in each set of encoded key slices), a decode threshold number (i.e., how many encoded key slices of each set are needed to recover each key 1-X), and an error encoding function (e.g., Reed-Solomon or other forward error correction (FEC) scheme, information dispersal algorithm, other error correction coding, etc.).

Appender select 244 selects at least a decode threshold number of encoded key slices of each set of encoded key slices to append to at least some of the encrypted data segments in accordance with an appending approach. The appending approach may include selecting encoded key slices and an encrypted data segment for appending at random, based on a pseudo-random approach, or any function such that no one encrypted data segment of the at least some of the encrypted data segments includes the at least the decode threshold number of encoded key slices of a set of encoded key slices of the sets of encoded key slices. The appending approach may be included as a dispersal parameter in the key IDA encoder 242. Appender select 244 selects the encoded key slices for appending and instructs appender 238 on how to append the encoded key slices to the encrypted data segments 1-X. Appender 238 appends at least a decode threshold number of encoded key slices of each of the sets of encoded key slices to at least some of the encrypted data segments to produce secure packages 1-X.

FIG. 14 is a schematic block diagram of an example of secure packages 258. Secure packages 258 include encrypted data segments 1-5 (i.e., the data object has been segmented into data segments 1-5 and each data segment has been encrypted by a corresponding key 1-5) that are appended with encoded key slices of sets of encoded key slices 257 in accordance with an appending approach.

In this example, each key 1-5 is dispersed storage error encoded using a key dispersed storage error encoding function with a pillar number of 5 and a decode threshold number of 3. As such, at least 3 encoded key slices from each set of encoded key slices need to be appended to at least some of the encrypted data segments in order to recover keys 1-5. Here, an appending approach specified appending at least the decode threshold number (3) of encoded key slices from each set of encoded key slices in a random sequence while ensuring that no one encrypted data segment is appended with at least the decode threshold number (3) of encoded key slices from a set of encoded key slices.

For example, key slices 1_1 and 2_1 from the first set of encoded key slices and key slice 1_2 from the second set of encoded key slices are appended to encrypted data segment 1, key slice 3_1 from the first set of encoded key slices and key slice 2_3 from the third set of encoded key slices are appended to encrypted data segment 2, key slices 2_2 and 3_2 from the second set of encoded key slices and key slices 4_3 and 5_3 from the third set of encoded key slices are appended to encrypted data segment 3, key slice 3_4 from the fourth set of encoded key slices and key slices 1_5 and 2_5 from the fifth set of encoded key slices are appended to encrypted data segment 4, and key slice 3_5 from the fifth set of encoded key slices and key slices 2_4 and 5_4 from the fourth set of encoded key slices are appended to encrypted data segment 5.

Figure 15:
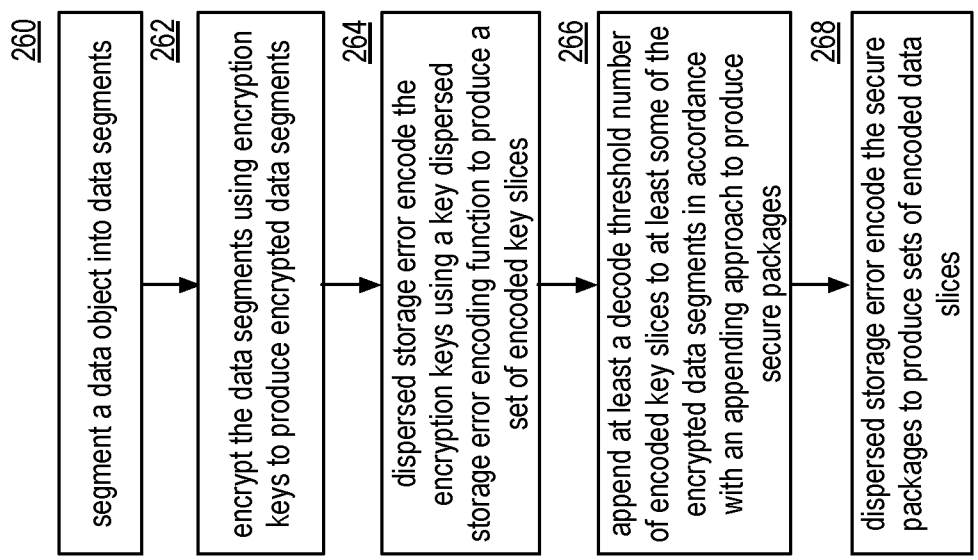
FIG. 15 is a logic flowchart illustrating an example of securely storing random keys in accordance with the invention.

FIG. 15 is a logic flowchart illustrating an example of securely storing random keys. The method begins with step 260 where a computing device of a dispersed storage network (DSN) segments a data object into data segments. Random key generators (RKGs) generate encryption keys based on a key generating approach and may retrieve encryption keys from a local memory of one or more local memories associated with the encoding of each data segment of the data segments. The key generating approach may be based on one or more of a key seed, a pseudorandom sequence, a random number generator, a predetermined list, a lookup, a private key retrieval, and public-key retrieval, a public/private key pair generation, and a key generation algorithm.

The method continues with step 262 where the computing device encrypts the data segments using the encryption keys to produce encrypted data segments. For example, a first encryption key of the encryption keys is used to encrypt a first data segment of the data segments to produce a first encrypted data segment of the encrypted data segments.

The method continues with step 264 where the computing device dispersed storage error encodes the encryption keys using a key dispersed storage error encoding function to produce a set of encoded key slices. Dispersal parameters of the key dispersed storage error encoding function include the pillar width number Wk (i.e., how many encoded key slices are in the set of encoded key slices), a decode threshold number (i.e., how many encoded key slices are needed to recover keys 1-X), and an error encoding function (e.g., Reed-Solomon or other forward error correction (FEC) scheme, information dispersal algorithm, other error correction coding, etc.).

The method continues with step 266 where the computing device appends at least a decode threshold number of encoded key slices of the set of encoded key slices to at least some of the encrypted data segments in accordance with an appending approach to produce secure packages. For example, a first encoded key slice of the at least the decode threshold number of encoded key slices is appended to the first encrypted data segment to produce a first secure package of the secure packages. The appending approach may include selecting encoded key slices and an encrypted data segment for appending at random, based on a pseudo-random approach, or any function such that no one encrypted data segment is appended with the at the least the decode threshold number of encoded key slices. The appending approach may be included as a dispersal parameter in the key dispersed storage error encoding function.

Alternatively, each encryption key of the encryption keys is dispersed storage error encoded using a key dispersed storage error encoding function in accordance with dispersal parameters to produce sets of encoded key slices. The computing device appends at least a decode threshold number of encoded key slices of each of the sets of encoded key slices to at least some of the encrypted data segments in accordance with a second appending approach to produce the secure packages. The second appending approach may include selecting encoded key slices and an encrypted data segment for appending at random, based on a pseudo-random approach, or any function such that no one encrypted data segment of the at least some of the encrypted data segments includes the at least the decode threshold number of encoded key slices of a set of encoded key slices of the sets of encoded key slices.

The method continues with step 268 where the computing device dispersed storage error encodes the secure packages to produce sets of encoded data slices. For example, the first secure package is dispersed storage error encoded using the dispersed storage error encoding function to produce a first set of encoded data slices of the sets of encoded data slices and a second secure package of the secure packages is dispersed storage error encoded using the dispersed storage error encoding function to produce a second set of encoded data slices of the sets of encoded data slices. The dispersed storage error encoding function includes dispersal parameters (i.e., pillar width number, a decode threshold number, and an error encoding function (e.g., Reed-Solomon or other forward error correction (FEC) scheme, information dispersal algorithm, other error correction coding, etc.)) that can differ from the dispersal parameters of the key dispersed storage error encoding function. The computing device sends the sets of encoded data slices to a set of storage devices of the DSN for storage therein.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a storage network comprises:
    dispersed storage error decoding, by the computing device, a plurality of sets of encoded data slices to recover a plurality of secure packages, wherein the plurality of secure packages include a plurality of encrypted data segments and a plurality of sets of encoded key slices, wherein at least a decode threshold number of encoded key slices of a set of encoded key slices of the plurality of sets of encoded key slices are appended to at least some of the encrypted data segments in accordance with an appending approach to produce a secure package of the plurality of secure packages, and wherein the encrypted data segments were not dispersed storage error encoded prior to the appending the at least a decode threshold number of encoded key slices to the at least some of the encrypted data segments;
    splitting, by the computing device, the plurality of secure packages into the plurality of encrypted data segments and the plurality of sets of encoded key slices;
    dispersed storage error decoding, by the computing device, the plurality of sets of encoded key slices to recover a plurality of encryption keys; and decrypting, by the computing device, the plurality of encrypted data segments using the plurality of encryption keys to recover data segments.

2. The method of claim 1 further comprises:
de-segmenting, by the computing device, at least some of the data segments to recover a data object.

3. The method of claim 1 further comprises:
obtaining the plurality of sets of encoded data slices from storage units of the storage network.

4. The method of claim 1, wherein the appending approach includes:
appending, by the computing device, an encoded key slice of the at least the decode threshold number of encoded key slices to the at least some of the encrypted data segments in a random sequence, wherein no one encrypted data segment of the at least some of the encrypted data segments includes the at least the decode threshold number of encoded key slices.

5. The method of claim 1, wherein the appending approach includes:
appending, by the computing device, an encoded key slice of the at least the decode threshold number of encoded key slices to the at least some of the encrypted data segments in a pseudo random sequence, wherein no one encrypted data segment of the at least some of the encrypted data segments includes the at least the decode threshold number of encoded key slices.

6. The method of claim 1, wherein the appending approach includes:
appending, by the computing device, an encoded key slice of the at least the decode threshold number of encoded key slices to the at least some of the encrypted data segments according to a function, wherein no one encrypted data segment of the at least some of the encrypted data segments includes the at least the decode threshold number of encoded key slices.

7. The method of claim 1 wherein the plurality of encryption keys were dispersed storage error encoded into the plurality of sets of encoded key slices using a key dispersed storage error encoding function.

8. The method of claim 7, wherein the secure packages were dispersed storage error encoded into the plurality of sets of encoded data slices using a dispersed storage error encoding function.

9. The method of claim 8, wherein the key dispersed storage error encoding function has a first pillar width, a first decode threshold, and a first error encoding function, and the dispersed storage error encoding function has a second pillar width, a second decode threshold, and a second error encoding function.

10. The method of claim 1, wherein a data segment of the data segments was encrypted using an encryption key of the plurality of encryption keys to produce an encrypted data segment of the encrypted data segments.

11. A computing device of a storage network, the computing device comprises:
an interface;
memory; and
a processing module operably coupled to the memory and the interface, wherein the processing module is operable to:
dispersed storage error decode a plurality of sets of encoded data slices to recover a plurality of secure packages, wherein the plurality of secure packages include a plurality of encrypted data segments and a plurality of sets of encoded key slices, wherein at least a decode threshold number of encoded key slices of a set of encoded key slices of the plurality of sets of encoded key slices are appended to at least some of the encrypted data segments in accordance with an appending approach to produce a secure package of the plurality of secure packages, and wherein the encrypted data segments were not dispersed storage error encoded prior to the appending the at least a decode threshold number of encoded key slices to the at least some of the encrypted data segments;
split the plurality of secure packages into the plurality of encrypted data segments and the plurality of sets of encoded key slices;
dispersed storage error decode the at least the decode threshold number of each set of the plurality of sets of encoded key slices to recover a plurality of encryption keys; and
decrypt the plurality of encrypted data segments using the plurality of encryption keys to recover data segments.

12. The computing device of claim 11, wherein the processing module is further operable to:
de-segment at least some of the data segments to recover a data object.

13. The computing device of claim 11, wherein the processing module is further operable to:
receive, via the interface, the plurality of sets of encoded data slices from storage units of the storage network.

14. The computing device of claim 11, wherein the processing module is further operable to perform the appending approach by:
appending an encoded key slice of the at least the decode threshold number of encoded key slices to the at least some of the encrypted data segments in a random sequence, wherein no one encrypted data segment of the at least some of the encrypted data segments includes the at least the decode threshold number of encoded key slices.

15. The computing device of claim 11, wherein the processing module is further operable to perform the appending approach by:
appending an encoded key slice of the at least the decode threshold number of encoded key slices to the at least some of the encrypted data segments in a pseudo random sequence, wherein no one encrypted data segment of the at least some of the encrypted data segments includes the at least the decode threshold number of encoded key slices.

16. The computing device of claim 11, wherein the processing module is further operable to perform the appending approach by:
appending an encoded key slice of the at least the decode threshold number of encoded key slices to the at least some of the encrypted data segments according to a function, wherein no one encrypted data segment of the at least some of the encrypted data segments includes the at least the decode threshold number of encoded key slices.

17. The computing device of claim 11, wherein the plurality of encryption keys were dispersed storage error encoded into the plurality of sets of encoded key slices using a key dispersed storage error encoding function.

18. The computing device of claim 17, wherein the secure packages were dispersed storage error encoded into the plurality of sets of encoded data slices using a dispersed storage error encoding function.

19. The computing device of claim 18, wherein the key dispersed storage error encoding function has a first pillar width, a first decode threshold, and a first error encoding function, and the dispersed storage error encoding function has a second pillar width, a second decode threshold, and a second error encoding function.

20. The computing device of claim 11, wherein the processing module is further operable to encrypt a data segment of the data segments using an encryption key of the plurality of encryption keys to produce an encrypted data segment of the encrypted data segments.

* * * * *